US011468770B2

(12) United States Patent
Yamashita et al.

(10) Patent No.: US 11,468,770 B2
(45) Date of Patent: Oct. 11, 2022

(54) TRAVEL CONTROL APPARATUS, TRAVEL CONTROL METHOD, AND COMPUTER PROGRAM

(71) Applicant: KABUSHIKI KAISHA TOSHIBA, Tokyo (JP)

(72) Inventors: Michio Yamashita, Tokyo (JP); Noriyuki Hirayama, Tokyo (JP); Hideyuki Aisu, Kawasaki Kanagawa (JP); Shizu Sakakibara, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 27 days.

(21) Appl. No.: 17/007,039

(22) Filed: Aug. 31, 2020

(65) Prior Publication Data

US 2021/0125493 A1  Apr. 29, 2021

(30) Foreign Application Priority Data

Oct. 29, 2019  (JP) .............................. JP2019-196647

(51) Int. Cl.
*G08G 1/01* (2006.01)
*G05D 1/02* (2020.01)
*G08G 1/09* (2006.01)

(52) U.S. Cl.
CPC ......... *G08G 1/0145* (2013.01); *G05D 1/0297* (2013.01); *G08G 1/091* (2013.01)

(58) Field of Classification Search
CPC ..... G08G 1/0145; G08G 1/091; G05D 1/0297
See application file for complete search history.

(56) References Cited

U.S. PATENT DOCUMENTS

| | | | | |
|---|---|---|---|---|
| 9,829,333 | B1* | 11/2017 | Calder | G06Q 10/08 |
| 11,237,008 | B2* | 2/2022 | Paruchuri | B60W 40/02 |
| 2013/0317642 | A1* | 11/2013 | Asaria | G06Q 50/28 |
| | | | | 700/216 |
| 2018/0299882 | A1* | 10/2018 | Kichkaylo | G05D 1/0274 |
| 2019/0286145 | A1* | 9/2019 | LaFary | G05D 1/0255 |
| 2020/0293063 | A1 | 9/2020 | Aisu | |
| 2020/0327768 | A1* | 10/2020 | Rossano | G06Q 10/08 |
| 2021/0018912 | A1* | 1/2021 | Dymesich | G05D 1/0225 |
| 2021/0049037 | A1* | 2/2021 | Kattepur | B25J 9/1661 |

FOREIGN PATENT DOCUMENTS

| | | |
|---|---|---|
| JP | 2692725 B2 | 12/1997 |
| JP | 2017-117328 A | 6/2017 |
| JP | 2020-149370 A | 9/2020 |

\* cited by examiner

*Primary Examiner* — Hussein Elchanti
(74) *Attorney, Agent, or Firm* — Finnegan, Henderson, Farabow, Garrett & Dunner L.L.P.

(57) ABSTRACT

According to one embodiment, a travel control apparatus includes an area setter configured to set a second area on at least one of a plurality of travel paths provided among a plurality of first areas; and a travel controller configured to control timing of a first mobile body to pass through the second area on a travel route of the first mobile body based on passing sequence information on one of the first areas that is located behind the second area, wherein the passing sequence information defines a sequence in which a plurality of mobile bodies including the first mobile body passes through the first area.

15 Claims, 15 Drawing Sheets

COLLISION

DEADLOCK

| ARC ID | FIRST NODE ID | SECOND NODE ID |
|---|---|---|
| 1 | Pa | Na |
| ... | ... | ... |

| NODE ID | X COORDINATE | Y COORDINATE |
|---|---|---|
| Pb | 20 | 20 |
| Na | 20 | 60 |
| ... | ... | ... |

OPERATION INFORMATION

| No | DEPARTURE POINT | ARRIVAL POINT |
|---|---|---|
| 1 | Pa | Pb |
| 2 | Pc | Pd |

FIG. 12A

TRAVEL PLAN

| No | MOBILE BODY | TRAVEL ROUTE & DEPARTURE/PASSAGE TIMING |
|---|---|---|
| 1 | AGV0 | Pa(0), Na(10), Pb(20) |
| 2 | AGV1 | Pc(10), Na(20), Pd(30) |

FIG. 12B

OPERATION PLAN

| TRAVEL ROUTE INFORMATION | | | PASSING SEQUENCE INFORMATION | | |
|---|---|---|---|---|---|
| No | MOBILE BODY | TRAVEL ROUTE | No | DESIGNATED AREA | PASSING SEQUENCE |
| 1 | AGV0 | Pa, Na, Pb | 1 | Na | AGV0, AGV1 |
| 2 | AGV1 | Pc, Na, Pd | | | |

| No | MOBILE BODY | MOVE COMMAND DATA |
|---|---|---|
| 1 | AGV0 | Pa,Ia,Check(Na),Ib, Notice(Na),Pb |
| 2 | AGV1 | Pc,Ic,Check(Na), Id, Notice(Na),Pd |

SMALL AGV

LARGE AGV

| No | MOBILE BODY | MOVE COMMAND DATA WITH DIRECTION SPECIFIED |
|---|---|---|
| 1 | AGV0 | Pa, Ia_right, Check(Na), Ib_up, Notice(Na), Pb |
| 2 | AGV1 | Pc, Ic_up, Check(Na), Id_right, Notice(Na), Pd |

TRAVEL CONTROL APPARATUS, TRAVEL CONTROL METHOD, AND COMPUTER PROGRAM

CROSS REFERENCE TO RELATED APPLICATIONS

This application is based upon and claims the benefit of priority from the prior Japanese Patent Application No. 2019-196647, filed on Oct. 29, 2019, the entire contents of which are incorporated herein by reference.

FIELD

Embodiments described herein relates to a travel control apparatus, a travel control method, and a computer program.

BACKGROUND

In making a plurality of mobile bodies travel according to an operation plan, if the mobile bodies can travel along a planned travel route according to a timing schedule, operation can be achieved as planned. However, if departure/passage timing of at least any one of the mobile bodies deviates from the plan, contention may occur among the mobile bodies. For example, there may occur a collision or rear-end collision between mobile bodies or a deadlock that disables a mobile body from moving to a desired location.

BRIEF DESCRIPTION OF THE DRAWINGS

FIGS. 12A and 12B are diagrams showing an example of operation plans created by an operation plan determination device;

DETAILED DESCRIPTION

According to one embodiment, a travel control apparatus includes an area setter, and a travel controller. The setter sets a second area on at least one of a plurality of travel paths provided among a plurality of first areas. The travel controller controls timing of a first mobile body to pass through the second area on a travel route of the first mobile body based on passing sequence information on one of the first areas that is located behind the second area. The passing sequence information defines a sequence in which a plurality of mobile bodies including the first mobile body passes through the first area.

A typical operation planning system often creates operation plans for guideline type mobile bodies configured to travel along a straight single line such as a rail or tape. When a straight single line is used exclusively, disturbances occur less frequently and mobile bodies can be made to travel almost accurately according to a timing schedule.

On the other hand, autonomous mobile bodies travel freely in a relatively large area by finding an optimum traffic line by identifying their own positions. Examples of autonomous mobile bodies include an automatic guided vehicle (AGV) configured to transport loads in a factory. A travel path of an autonomous mobile body may sometimes be walked or crossed by persons and the mobile body may be equipped with a function to stop by recognizing any person running into the travel path. Also, the mobile body may be equipped with a function to recognize any obstacle lying on the travel path and travel by avoiding the obstacle.

In this way, autonomous mobile bodies are capable of flexible travel, but disturbances often occur in travel environment, making it difficult to travel according to a timing schedule. For example, when moving by avoiding obstacles, the mobile bodies cannot travel according to a timing schedule.

If timing of any of the mobile bodies deviates from the plan, contention can occur among the mobile bodies. For example, there may occur a collision or rear-end collision between mobile bodies. Also, there may occur a deadlock that disables a mobile body from moving to a desired location (e.g., an intersection of travel paths or an end of a travel path).

According to embodiments of the present invention, occurrence of contention among mobile bodies can be avoided even when an operation plan is created for an autonomous mobile body in this way. However, mobile bodies handled in the embodiments are not limited to autonomous mobile bodies, and guideline type mobile bodies are handled as well. The embodiments of the present invention will be described in detail below with reference to the accompanying drawings.

Figure 1:
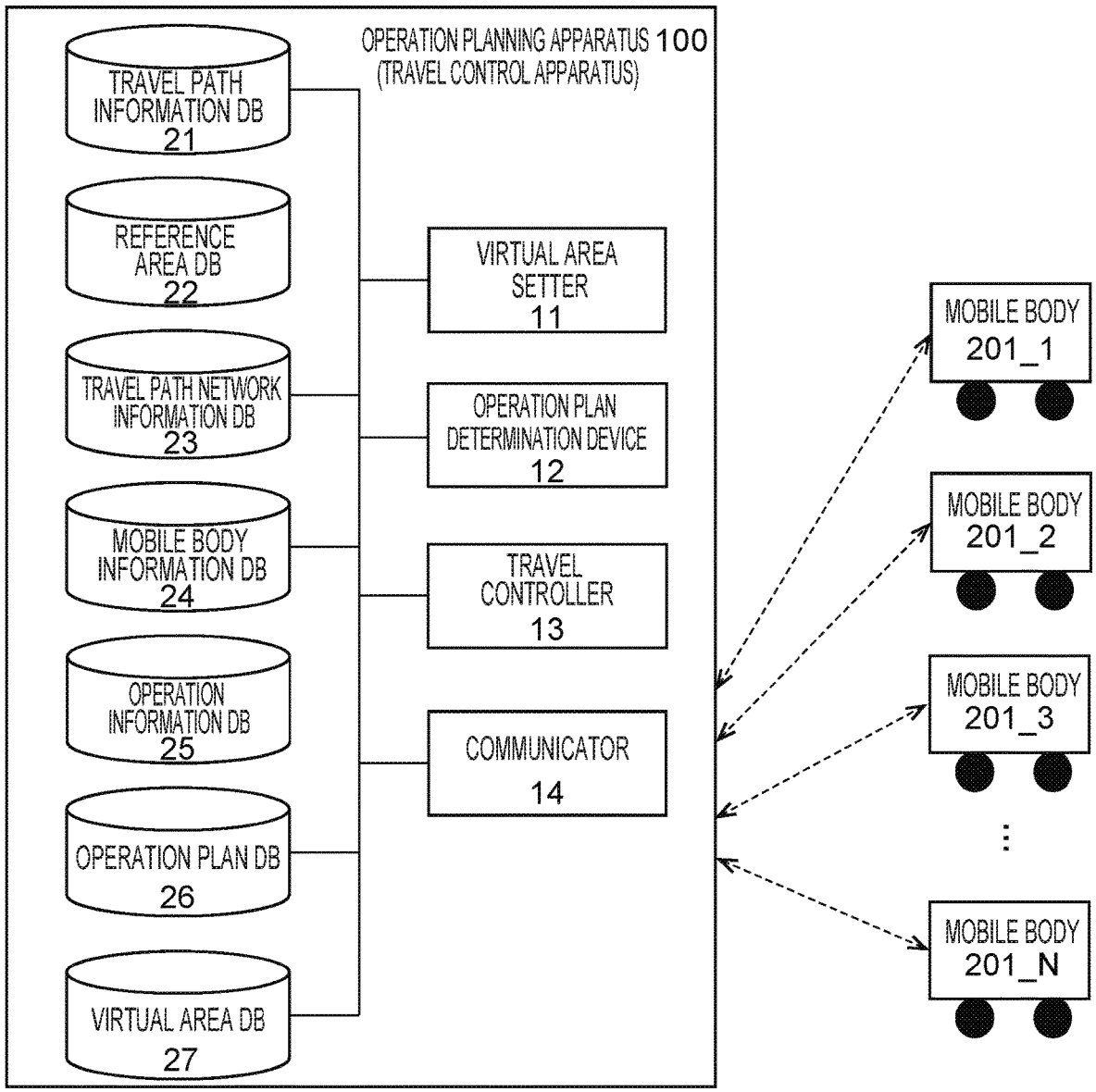
FIG. 1 is a block diagram of operation planning apparatus as a travel control apparatus according to the present embodiment.

FIG. 1 shows a block diagram of an operation planning apparatus as a travel control apparatus according to the present embodiment. The operation planning apparatus 100 includes a virtual area setter (area setter) 11, an operation plan determination device 12, a travel controller 13, a communicator 14, a travel path information database (DB) 21, a reference area DB 22, a travel path network information DB 23, a mobile body information DB 24, an operation information DB 25, an operation plan DB 26, and a virtual area DB 27. A part of or all of elements in the operation planning apparatus can be implemented by circuitry such as a processor, a CPU (central processing unit), or ASIC (Application Specific Integrated Circuit).

If, for example, the plurality of mobile bodies 201_1 to 201_N travel autonomously in a travel area (travel path network), which is a free plane, the operation planning apparatus 100 creates an operation plan for use to control operation in order to keep the plurality of mobile bodies from causing contention such as collisions or deadlocks. The plurality of mobile bodies 201_1 to 201_N are moving vehicles such as AGVs, autonomous mobile robots, autonomous vehicles (e.g., self-driving cars), or other mobile bodies capable of autonomous movement.

The plurality of mobile bodies 201_1 to 201_N travel, for example, in a travel area (travel path network) of a factory, a storehouse, or facility premises. The plurality of mobile bodies 201_1 to 201_N, for example, carry rechargeable batteries and carry out movements and other motions using electric power stored in the batteries.

Figure 2:
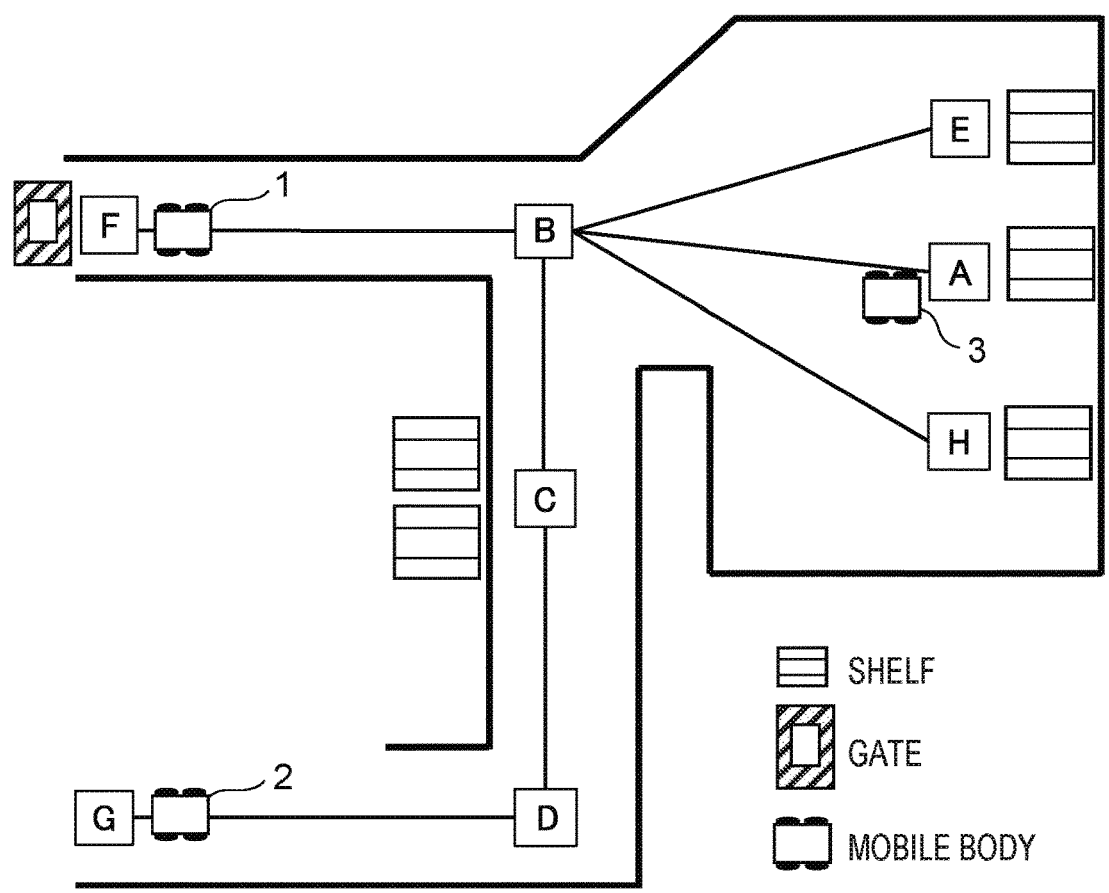
FIG. 2 is a top view schematically showing how operation of a plurality of mobile bodies are controlled.

FIG. 2 is a top view schematically showing how operation of a plurality of mobile bodies are controlled in a travel path network. A plurality of areas (reference areas) A, B, C, D, E, F, G, and H serving as references are set in the travel path network. Between each pair of reference areas, there is a passage (travel path) along which a mobile body can move. In this way, the travel path network (travel area) includes a plurality of reference areas as well as a plurality of travel paths among the plurality of reference areas. The reference areas correspond to any locations such as an intersection of travel paths or ends of travel paths. Gates are provided in the reference areas F and G and shelfs are provided in the reference areas A, E, and H. The reference area B corresponds to an intersection of a plurality of travel paths.

Here, each reference area may be located in a specific position or may be an area having a specific range. For example, if the travel path network is represented by an X-Y plane, reference areas are identified by X-Y coordinates. When height is taken into consideration, reference areas are identified by X-Y-Z coordinates. Alternatively, each reference area may be identified by a group of a plurality of X-Y coordinates. For example, when the reference area is rectangular, the reference area may be identified by a group of X-Y coordinates of diagonal vertices. It is assumed below that the reference areas are identified by X-Y coordinates.

A plurality of reference areas are managed as reference nodes by being associated with coordinates on map data of the travel path network. Reference nodes and corresponding reference areas are denoted by the same reference signs for convenience of explanation. A line (arc) linking each pair of reference areas is managed as a virtual travel path along which a mobile body travels. Reference nodes and virtual travel paths are stored in advance in the form of data. Solid lines and broken lines in FIG. 2 are lines (which correspond to virtual travel paths) linking reference nodes. If two or more mobile bodies can run in parallel between reference nodes, the reference nodes may be linked by two or more lines. Data on reference nodes and virtual travel paths are defined on map data. The map data may be defined in advance in the form of CAD (Computer-Aided Design) drawings or other drawings. Alternatively, if the mobile bodies have a function to create environmental maps using a self-position detection function, an environmental map may be created using this function. Note that the virtual travel paths have the shape of a straight line, a curved line, or a combination thereof.

Mobile bodies 1, 2, and 3 correspond to the mobile bodies 201_1 to 201_3 of FIG. 1. The mobile bodies 1 to 3 have an autonomous travel function. More specifically, the mobile bodies 1 to 3 have a function to generate lines of flow along travel paths among reference areas by themselves and autonomously travel along the formed lines of flow. As an example, when moving from a reference area B to a reference area C, if there is no obstacle between the reference area B and reference area C, a given one of the mobile bodies generates a line segment linking the position of the reference area B and position of the reference area C as a line of flow and autonomously travels along the line of flow. The line of flow generated by the mobile body may or may not coincide with a virtual travel path between the reference node B and reference node C. In moving between the two reference nodes, the mobile body may have a function to travel along a virtual travel path as a recommended travel path and avoid any temporary obstacle found on the virtual travel path.

Note that a travel path that provides leeway for mobile bodies to travel by avoiding any obstacle may be treated as a travel path on which no contention occurs between the mobile bodies. For example, because a travel path BE (travel path between reference area B and reference area E; the same applied hereinafter), travel path BA, travel path BH, and other travel paths in FIG. 2 have enough leeway to allow mobile bodies to go past each other, no contention will occur even if two mobile bodies travel in a head-on direction. For example, one of the mobile bodies waits on the side of the travel path while the other mobile body moves along the line of flow on the travel path. When the second mobile body has passed through the travel path, the first mobile body resumes moving. On the other hand, because the travel path BC does not have enough leeway to allow mobile bodies to go past each other, if two mobile bodies travel in a head-on direction on the travel path, contention such as a collision will occur.

Note that the mobile bodies can move forward, backward, or both forward and backward. The mobile bodies may be rotatable and thus capable of making forward/backward direction changes. Also, the mobile bodies may be capable of moving in directions such as oblique directions other than forward/backward directions.

Sensors configured to detect states of mobile bodies, communication devices configured to communicate with the mobile bodies or both of them may be placed in reference areas, travel paths, shelves, gates, or any other locations. In that case, the sensors are connected to at least either of the operation planning apparatus 100 and communication devices by wire or radio.

Under the control of the operation planning apparatus 100 shown in FIG. 1, each mobile body travels in the travel path network according to an assigned operation. For example, the mobile body carries a load received from a gate to another gate. There are cases in which the work of loading or unloading loads from/onto a shelf is carried out in the process of movement. Each mobile body carries out such work by executing instructions contained in move command data given by the operation planning apparatus 100. Note that there can be cases in which the mobile body only moves without conveying loads.

Now, collisions and deadlocks will be described.

Figure 3A:
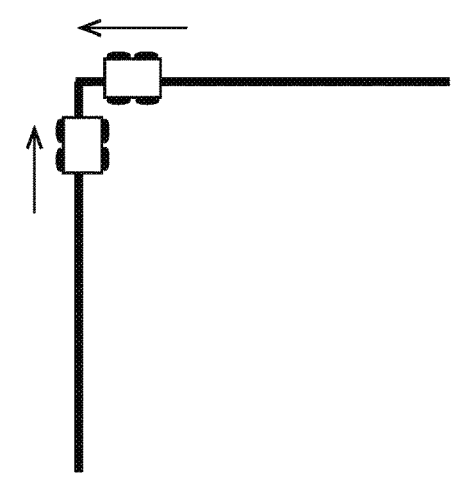
FIG. 3A is a diagram showing an example of a collision and FIG. 3B is a diagram showing an example of a deadlock.
Figure 3B:
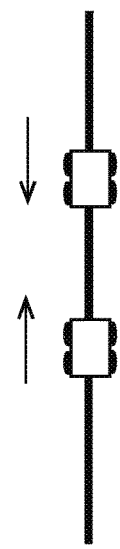

FIG. 3A shows an example of a collision and FIG. 3B shows an example of a deadlock. In FIGS. 3A and 3B, travel paths are represented by straight lines for convenience. In FIG. 3A, two mobile bodies travel toward an intersection along two travel paths leading to the intersection, and arrive at the intersection at the same time, resulting in a collision. In FIG. 3B, two mobile bodies travel in opposite directions along the same travel path. If the two mobile bodies can only move forward, the two mobile bodies cannot go backward and thus cannot move to a desired area (intersection, end, or the like), which results in a deadlock.

The contention among mobile bodies is not limited to collisions and deadlocks. For example, the contention also includes a case in which when one or more mobile bodies are waiting at an intersection leading to a travel path, another mobile body is navigating on the travel path.

The operation planning apparatus 100 shown in FIG. 1 allows mobile bodies to travel efficiently without causing contention among the mobile bodies.

The travel path network information DB 23 stores structure information about the travel path network therein. The structure information about the travel path network includes reference nodes and virtual travel paths (arcs) arranged by being associated with map data of travel areas. The reference nodes correspond to reference areas. The reference areas are set at an intersection of a plurality of travel paths or ends of travel paths as an example. However, the reference areas may be set in any locations on travel paths. Examples of such locations include loading/unloading sites and waiting sites.

Figure 4:
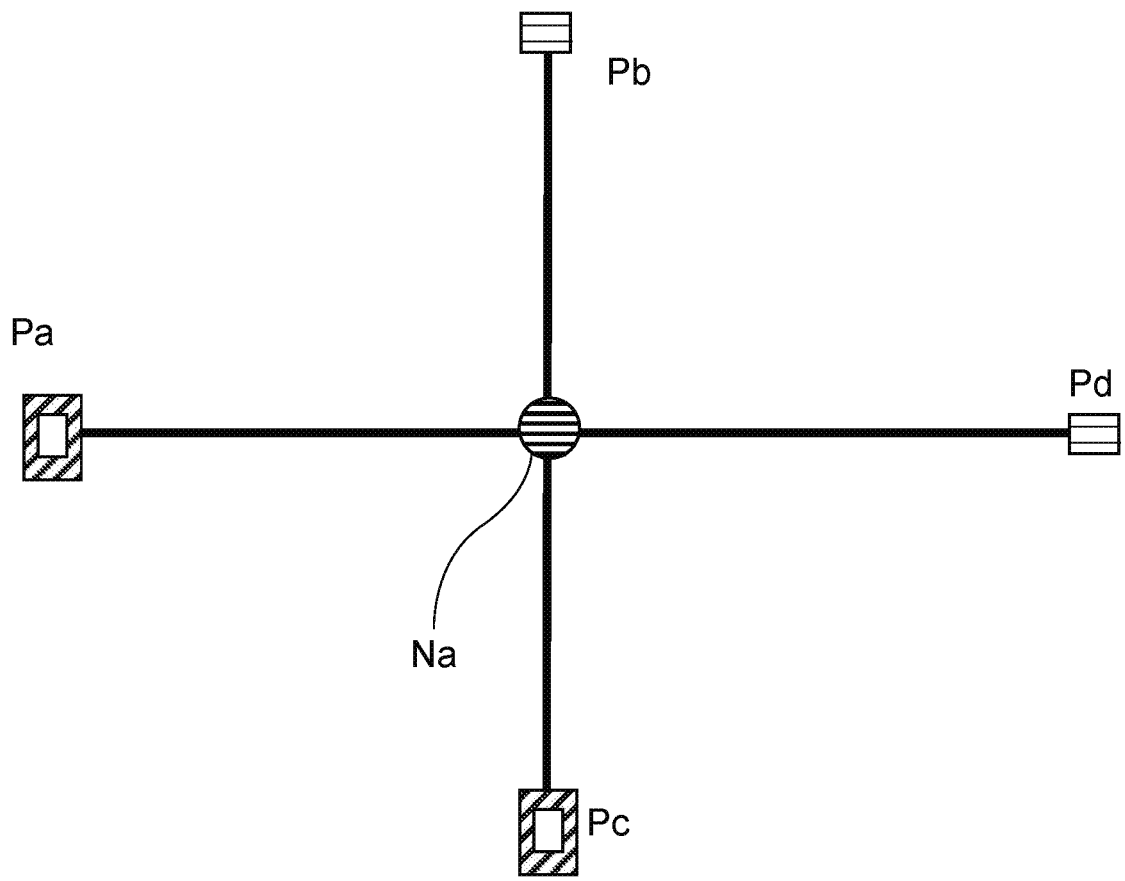
FIG. 4 is a diagram showing an example of a travel path network.
Figures 5, 6A, 6B:
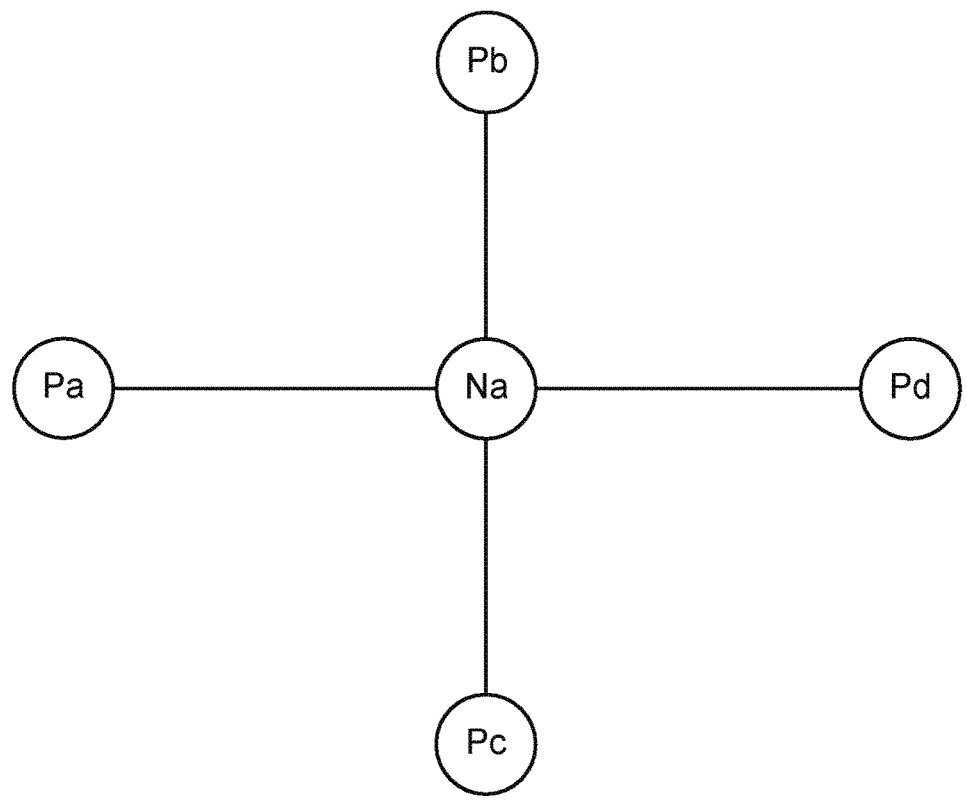
FIG. 5 is a diagram showing an example of structure information about the travel path network.
FIG. 6A is a diagram showing an example of information about a travel path and FIG. 6B is a diagram showing an example of information about reference nodes.

FIG. 4 shows a simple example of a travel path network. FIG. 5 shows an example of structure information about the travel path network of FIG. 4. The travel path network of FIG. 4 includes five reference areas and four travel paths. Here, the travel paths are represented by straight lines for convenience. A reference area Na is an intersection at which the four travel paths intersect and reference areas Pa, Pb, Pc, and Pd are ends of the four travel paths. Shelves are placed in the reference areas Pb and Pd and gates are provided in the reference areas Pa and Pc. The reference areas Pa, Pb, Pc, and Pd can also serve as departure points or arrival points of mobile bodies as an example.

In FIG. 5, virtual travel paths are represented by straight lines coupling (or connecting) reference nodes. Each circle represents a reference node (reference area), and straight lines tying the circles represent arcs (virtual travel paths). The reference nodes are denoted by the same reference signs as the corresponding reference areas.

The travel path information DB 21 stores information about the arcs (virtual travel paths) and information about the reference nodes in the structure information on the travel path network as travel path information. The travel path information includes arc IDs (travel path IDs) and IDs of the nodes on opposite ends of each arc (i.e., IDs of the areas on opposite ends of each travel path).

FIG. 6A shows an example of information about each arc (virtual travel path). In FIG. 6A, for example, the ID of the arc between the reference nodes Pa and Na is 1 and the reference nodes on opposite ends of the arc is Pa and Na.

Distances between reference nodes (distances of travel paths) may be stored by being associated with the arc IDs. Alternatively, the distance of the travel path may be calculated based on the positions of the reference nodes on opposite sides of each arc. Also, information about structure and arrangement of each travel path including the width, height, material, coefficient of friction, and slope of the travel path may be stored.

The information about the reference nodes in the structure information on the travel path network is also stored in the reference area DB 22. For example, reference node IDs, X coordinates, and Y coordinates are stored as the information about the reference nodes. The positions of the reference nodes correspond, for example, to positions (coordinates) of the reference areas corresponding to the reference nodes.

FIG. 6B shows an example of information about reference nodes. For example, the coordinates of the reference node Pb are (X, Y)=(20, 20). That is, the position of the reference area corresponding to the reference node Pb is (X, Y)=(20, 20). Also, the position of the reference node Na is (X, Y)=(20, 60). That is, the position of the reference area Na corresponding to the reference node Na is (X, Y)=(20, 60).

The virtual area setter 11 sets a virtual area on at least one travel path in relation to the reference areas set on the travel path network. The virtual area is used to manage a passing sequence of mobile bodies. Here, the virtual area is set on each travel path coupled (or connected) to reference areas, at a position away from the reference areas. That is, in the structure information on the travel path network, a virtual node is set on each arc coupled to reference nodes, at a position away from the reference nodes. Virtual areas may be set for all the reference areas on the travel path network or specific reference areas such as the reference area corresponding to the intersection, reference areas corresponding to the ends of travel paths, or both reference area corresponding to the intersection and reference areas corresponding to the ends of travel paths. Setting of virtual areas may be specified by a user, who is an operator of the apparatus 100, via an input device. Here, description will be given of a case in which a virtual area is set for the reference area corresponding to the intersection.

Figure 7:
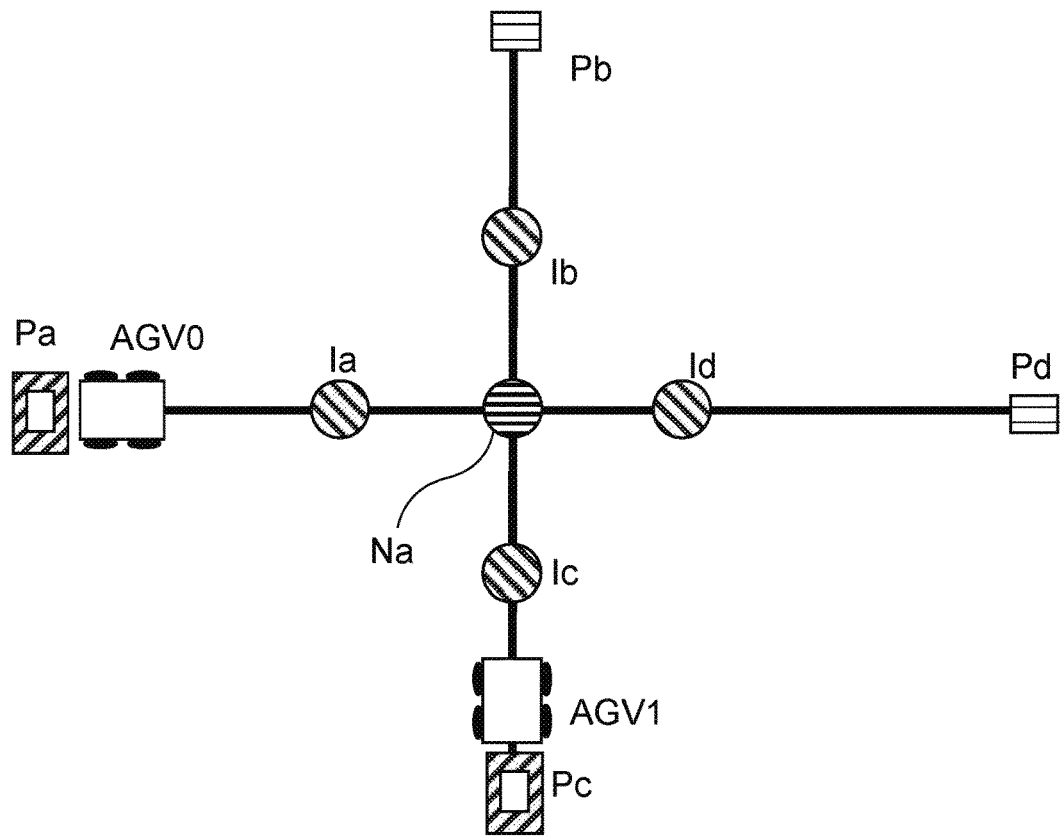
FIG. 7 shows an example in which a virtual area is set on each travel path coupled to a reference area of a travel path network.

FIG. 7 is a diagram showing an example in which a virtual area is set on each travel path coupled to a reference area (intersection) Na of the travel path network of FIG. 4. In this example, virtual areas Ia, Ib, Ic, and Id are set on the respective travel paths coupled to the intersection Na, at positions a predetermined distance away from the intersection Na.

The virtual area DB 27 stores information about the virtual areas set by the virtual area setter 11. Specifically, the virtual area DB 27 stores virtual nodes that represent the virtual areas, by associating the virtual nodes with reference nodes and virtual travel paths (arcs).

Figure 8:
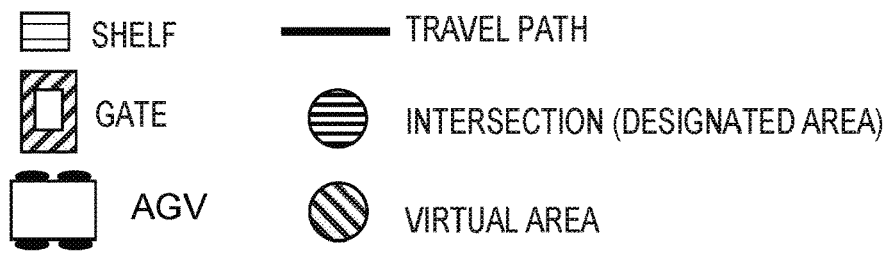
FIG. 8 is a diagram showing an example of a virtual area DB.

FIG. 8 shows an example of the virtual area DB 27. Here, in relation to the reference area (reference node) Na, the virtual area (virtual node) Ia of FIG. 7 is set on a travel path (arc with an ID of 1). The X-Y coordinates of the virtual area Ia are (15, 60).

Figure 9:
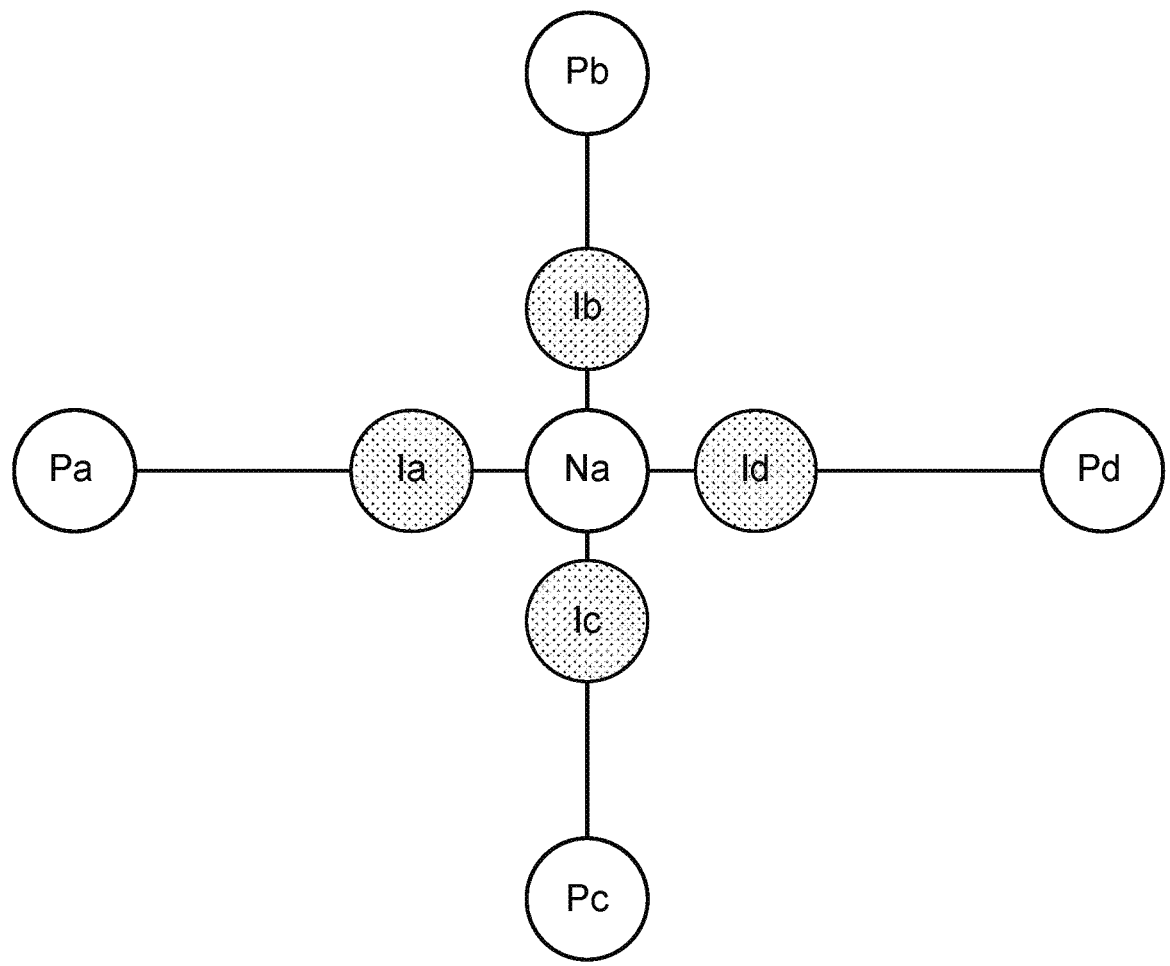
FIG. 9 is a diagram showing an example in which virtual nodes are added to structure information about a travel path network.

FIG. 9 shows an example in which virtual nodes are added to structure information about the travel path network in the example of FIG. 7. On the arcs coupled (or connected) to the reference node Na, virtual nodes Ia, Ib, Ic, and Id are set, respectively, at positions a predetermined distance away from the reference node Na. Note that the virtual nodes are denoted by the same reference signs as the corresponding virtual areas. Virtual nodes can also be set for the reference nodes Pa to Pd. In that case, the virtual nodes can be set, at positions a predetermined distance away from the reference nodes Pa to Pd, for example, on the respective arcs coupled to the reference nodes Pa to Pd.

Figures 10, 11:
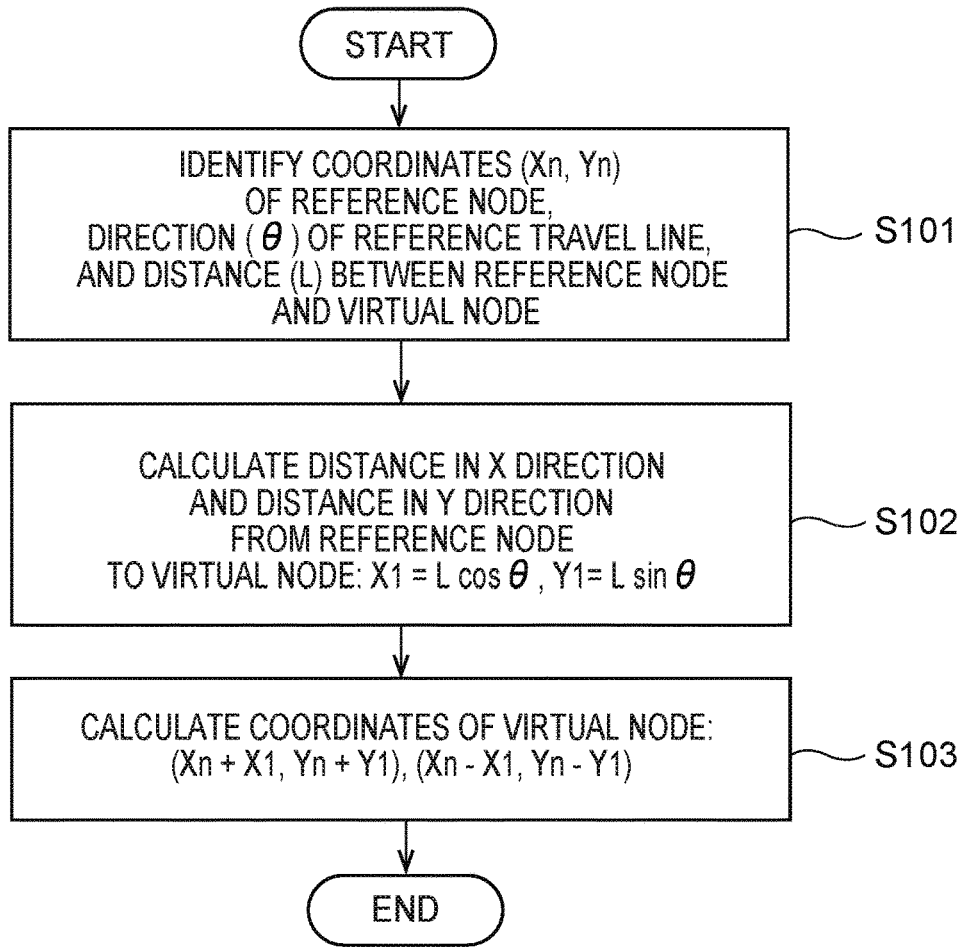
FIG. 10 is a flowchart showing an operation example of a virtual area setter.
FIG. 11 is a diagram showing an example of operation information.

FIG. 10 is a flowchart of an operation example of the virtual area setter 11. In this example, when a virtual node is linear, the virtual node is set at a position a predetermined distance away from a reference node.

In step S101, the reference node for which the virtual node is to be set is identified and the coordinates (Xn, Yn) of the identified reference node are identified. The reference node for which the virtual node is to be set may be a specific reference node (e.g., the reference node corresponding to an intersection) or every reference node or may be specified by the user. Also, the direction (θ) of each arc (virtual travel path) coupled to the identified reference node and the distance (L) between the reference node and virtual node are identified.

The coordinates of the reference node are acquired from the reference area DB 22. The direction θ of the virtual travel path is acquired from the travel path information DB 21. The distance L is a predetermined value. The distance L may be determined according to the structure, placement, and the like of the travel path corresponding to the virtual travel path. Also, the distance L may be determined according to properties (size) of mobile bodies. In that case, a virtual node may be set for each mobile body. Note that the distance L could be determined at random from a given value range.

In step S102, a distance X1 in the X direction and distance Y1 in the Y direction from the reference node to the virtual node are calculated. The distances X1 and Y1 are given by $X1=L \cos \theta$ and $Y1=L \sin \theta$.

In step S103, the coordinates of the virtual node are calculated. The coordinates of the virtual node are calculated from (Xn+X1, Yn+Y1).

The mobile body information DB 24 stores information about one or more mobile bodies. The mobile body information DB 24 stores, for example, positional information about mobile body/bodies. As an example, the positional information about the mobile body/bodies is real-time positional information (the latest positional information). For example, data containing positional information may be received from the mobile body/bodies every predetermined time and the positional information about the mobile body/bodies may be acquired from the received data. Alternatively, when a sensor provided in the travel path network detects passage of a mobile body, data informing passage of the mobile body may be received from a communication device connected to the sensor. The positional information about the mobile body/bodies may be positional information about a mobile body on standby yet to be assigned an operation. In that case, a standby position of the mobile body may be learned by receiving data containing the positional information from the communication device connected to the sensor installed on the mobile body on standby or in a waiting place. The data containing the positional information is received by the communicator 14. The positional information may be history information about positions passed by the mobile body so far. Examples of possible information other than positional information include remaining power in the battery carried by the mobile body, information as to whether the mobile body carries a load (when the mobile body is intended to convey loads), and the type and number of loads being conveyed. Examples of information specific to the mobile body include specification information about the mobile body including standard speed, maximum speed, minimum speed, size of the mobile body, and movable direction. If the mobile body is intended to convey loads, possible examples of information also include the working time required for loading/unloading (e.g., the time required to load or unload a predetermined number of loads). The information cited here is only exemplary, and other information may be used.

The operation information DB 25 stores operation information about operations to be assigned to one or more mobile bodies. The operation information includes information about departure points and arrival points. In addition to the departure points and arrival points, the operation information may include details and sequence of work to be carried out by the mobile body/bodies. The operation information may be entered by the user via an input device or acquired from an external apparatus by wired or wireless communication.

FIG. 11 shows an example of operation information. The operation information of FIG. 11 assumes the travel path network of FIG. 4.

The example of FIG. 11 shows two pieces of operation information. The first piece of operation information includes a departure point Pa and arrival point Pb. This means that the mobile body starts from the departure point Pa and arrives at the arrival point Pb. The second piece of operation information includes a departure point Pc and arrival point Pd. This means that the mobile body starts from the departure point Pc and arrives at the arrival point Pd.

The operation plan determination device 12 determines the mobile bodies to be assigned individual pieces of operation information in the operation information DB 25 and assigns operations specified by the operation information to the determined mobile bodies. For each mobile body assigned an operation, the operation plan determination device 12 creates a travel plan based on the operation assigned to the mobile body and information about the mobile body stored in the mobile body information DB 24. The travel plan includes the sequence of reference areas to be passed (travel route) and timing to start from or pass through the reference areas (departure/passage timing). The departure/passage timing is identified by the time on a clock provided on the operation planning apparatus 100 as an example.

The travel route and departure/passage timing of each mobile body are determined so as not to cause contention among mobile bodies. That is, if each mobile body travels using the departure/passage timing, no contention will occur. Regarding a method for creating the travel plan, any appropriate method can be used.

The travel route and departure/passage timing that will not cause contention may be determined, for example, by searching for every movement pattern of each mobile body using a simulation. In so doing, standard speed may be used as travel speed of the mobile body. The standard speed may be determined according to properties of the mobile body, properties of the travel path (such as the material of the travel path), the slope of the travel path, or the like. In so doing, by defining contention conditions likely to cause contention, movement patterns that do not meet the contention conditions may be searched for. Examples of the contention conditions include conditions in which two or more mobile bodies travel simultaneously in the same direction or opposite directions on the same travel path.

Alternatively, by first determining the travel route of each mobile body, then departure times (passage times) from reference areas included in the travel route may be determined such that no contention will occur among mobile bodies. The travel route may be such that will minimize the travel distance or travel time from departure point to destination point. In so doing, the departure times (passage times) from the reference areas may be determined such that the contention conditions will not be met.

The travel plan may be created using a method other than the one described above.

The operation plan determination device 12 identifies reference areas included in the travel routes of two or more mobile bodies in common. Of the identified reference areas, an area for use to manage the passing sequence of mobile bodies is determined as a designated area (passage management area). A reference node corresponding to the designated area is referred to as a designated node. There may be either one, or two or more, designated areas. Either all the identified reference areas or only part of them may be designated areas. The user may select designated areas. The operation plan determination device 12 stores information about the designated nodes in the operation plan DB 26, an internal buffer of the operation plan determination device 12, or the like. The reference areas or designated areas correspond to first areas as an example while virtual areas correspond to second areas as an example. An integrated area of a sixth variation described later also corresponds to the first area as an example.

The operation plan determination device 12 determines the passing sequence of mobile bodies for each designated area (designated node). For example, based on the travel plan, the operation plan determination device 12 compares the departure time in the designated area among the mobile bodies and determines the passing sequence of the mobile bodies in the designated area such that the earlier the departure time, the earlier the order will be. The operation plan determination device 12 generates information indicating a constraint that the mobile bodies need to pass according to the determined passing sequence, i.e., a constraint on the passing sequence in the designated area. This information is referred to as passing sequence information.

The operation plan determination device 12 obtains information about the travel route and the passing sequence information as an operation plan, where information about the travel route is contained in the travel plan of each mobile body (travel route information).

The operation plan DB 26 stores the operation plan (information about the travel route of each mobile body and the passing sequence information) created by the operation plan determination device 12 therein.

A concrete example of operation of the operation plan determination device 12 is shown below. First, the operation plan determination device 12 creates travel plans of AGV0 and AGV1 by assigning the first operation in FIG. 11 to AGV0, and the second operation in FIG. 11 to AGV1.

FIG. 12A shows an example of travel plans of AGV0 and AGV1. The travel routes of AGV0 are Pa, Na, and Pb and the departure times on Pa, Na, and Pb are 0, 10, and 20. That is, AGV0 departs from the point Pa at time 0, passes through (departs from) the intersection Na at time 10, and arrives at the point Pb at time 20. The travel routes of AGV1 are Pc, Na, and Pd and the departure times on Pc, Na, and Pd are 10, 20, and 30. That is, AGV1 departs from the point Pc at time 10, passes through (departs from) the intersection Na at time 20, and arrives at the point Pd at time 30. The points Pa to Pd and intersection Na are all reference areas.

Both AGV0 and AGV1 pass through the intersection Na. Therefore, the operation plan determination device 12 identifies Na as a designated area.

Also, the departure time of AGV0 from Na is 10 and the departure time of AGV1 from Na is 20. That is, regarding the passing sequence at the intersection Na, AGV0 passes first and AGV1 passes next. Thus, the operation plan determination device 12 generates passing sequence information including a constraint that AGV0 and AGV1 pass through Na in this order.

The operation plan determination device 12 obtains the travel route information and the created passing sequence information as an operation plan, where the travel route information is included in the created travel plan.

FIG. 12B shows an example of an operation plan obtained by the operation plan determination device 12. The travel routes of AGV0 are Pa, Na, and Pb and the travel routes of AGV1 are Pc, Na, and Pd. In the passing sequence information, the intersection Na is a designated area, and the passing sequence at the intersection Na is identified as follows: AGV0 passes first and AGV1 passes next.

Figures 13, 14:
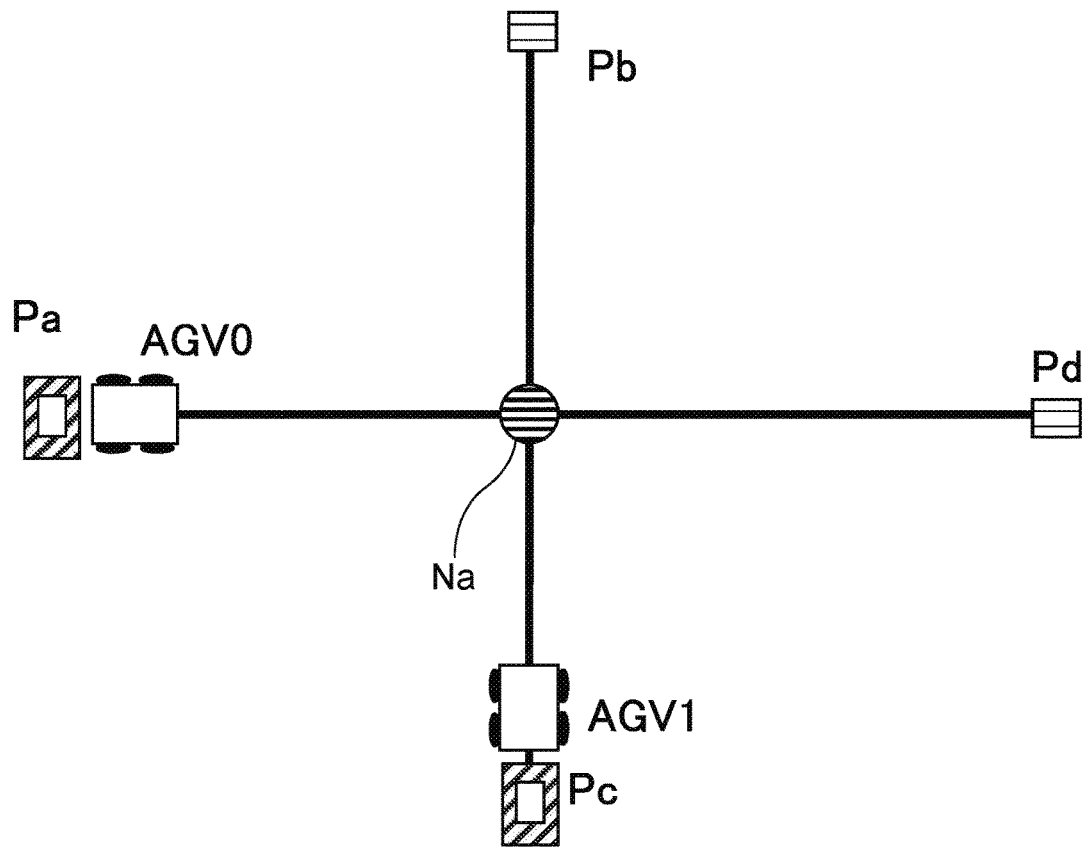
FIG. 13 is a diagram showing a state in which mobile bodies are placed at respective departure points.
FIG. 14 is a diagram showing an example of move command data.

FIG. 13 shows a state in which AGV0 and AGV1 are placed at the respective departure points Pa and Pc in the travel path network shown in FIG. 4, the departure points Pa and Pc being indicated in the operation plan. In FIG. 13, the travel paths are represented by straight lines for convenience. Note that before the operation plan is created, AGV0 and AGV1 are located at the respective departure points Pa and Pc, and the operation plan determination device 12 assigns operation information to AGV0 and AGV1 using the information that AGV0 and AGV1 are located at the points Pa and Pc, respectively. However, AGV0 and AGV1 may be placed at the points Pa and Pc, respectively, after being assigned operations.

The travel controller 13 controls travel of mobile bodies based on the mobile body operation plan (travel route information and passing sequence information) in the operation plan DB 26 and the virtual areas set by the virtual area setter 11. The travel controller 13 controls passage timing at each virtual area set by the virtual area setter 11 based on passing sequence information on a reference area (designated area) located behind the virtual area. Consequently, departure/passage timings of the mobile bodies in the designated area are adjusted in such a way as to avoid contention among a plurality of mobile bodies in the designated area. Details will be described below.

The travel controller 13 acquires the travel route of each mobile body based on the operation plan. The travel controller 13 generates one or more instructions in relation to each of the plurality of reference nodes (reference areas) included in the travel route.

The first reference area on the travel route corresponds to the departure point (start position) of the mobile body according to the present embodiment. Regarding the first reference area, an instruction to move to the departure point is generated (note that if already located at the departure point, the mobile body does not move even if the move instruction is executed).

The last reference area on the travel route corresponds to the arrival point (end position) of the mobile body. Regarding the last reference area, an instruction to move to the arrival point is generated.

Regarding any of reference areas other than the first reference area and last reference area, it is determined whether the reference area is a designated area. If the reference area is not a designated area, an instruction to move to a reference node corresponding to the reference area is generated.

If the reference area is a designated area (here it is assumed that a reference area N is a designated area), a travel path coupled before the reference area N is identified. Specifically, a virtual travel path coupled before the reference node corresponding to the reference area is identified, and a travel path corresponding to the virtual travel path is identified. Then, a virtual area (hereinafter referred to as a virtual area A) set for the reference area N on the identified travel path is identified. Also, on the travel route, a travel path coupled after the reference area N is identified, and a virtual area (hereinafter referred to as a virtual area B) set for the reference area N on the identified travel path is identified.

Then, the following instructions are generated: an instruction to move to the virtual area A (first instruction), an instruction to check whether it is permitted to pass through the reference area N (second instruction), an instruction to move to the virtual area B when it is permitted to pass through the reference area N (third instruction), and an instruction to transmit information to the apparatus 100, indicating that the reference area N has been passed after moving to the virtual area B (fourth instruction). It can also be said that the second instruction is an instruction to check whether it is permitted to start from or pass through the virtual area A and that the third instruction is an instruction to start from or pass through the virtual area A. In this way, four instructions are generated with regard to one reference area N.

The travel controller 13 arranges instructions generated, respectively, for the plurality of reference areas according to arranging sequence of the reference areas, the reference areas being included in the travel route, and thereby generates move command data.

The travel controller 13 transmits the move command data generated for the mobile body to the mobile body via the communicator 14.

The above operation is performed for all the mobile bodies for which the operation plan has been created. Consequently, move command data is generated for each mobile body.

An execution start time of a first instruction included in the move command data may be added. The execution start time of the first instruction may coincide with the departure time from a reference area in the travel plan. If work carried out by the mobile body is included in the travel plan or travel route, the instruction corresponding to the work is also added to the move command data. Examples of the work include receiving a load from a gate, carrying the received load to a shelf, and loading the load onto the shelf. Unloading the load from the shelf is also included.

FIG. 14 shows an example of move command data generated for AGV0 and AGV1 in the example of an operation plan (travel route information and passing sequence information) in FIG. 12B and the example of the travel path network in FIG. 7. Procedures for generating move command data for AGV0 and AGV1 are shown concretely below.

On the travel route of AGV0, since the first reference area Pa corresponds to the departure point, an instruction to move to the point Pa is generated. "Pa" in FIG. 14 means an instruction to move to Pa. Instructions may be written in any desired form. For example, an instruction to move to Pa may be expressed as Move_Pa. Note that in the present example, since AGV0 is already located at the departure point, even if this instruction is executed, AGV0 does not move actually. Therefore, generation of the instruction to move to Pa may be omitted.

On the travel route of AGV0, the place of the second area Na in the passing sequence has been defined by the passing sequence information. Therefore, on the travel route of AGV0, the travel path on which AGV0 travels just before the area Na is identified. On the identified travel path, the virtual area Ia set for the area Na is identified. A specific process involves identifying a virtual travel path on which AGV0 travels just before the reference node Na and identifying a virtual node Ia for the reference node Na on the identified virtual travel path.

Also, on the travel route of AGV0, the travel path on which AGV0 travels just after the area Na is identified. On the identified travel path, the virtual area Ib set for the area Na is identified. A specific process involves identifying a virtual travel path on which AGV0 travels just after the reference node Na and identifying a virtual node Ib for the reference node Na on the identified virtual travel path.

Thus, the following instructions are generated:
an instruction "Ia" to move to the virtual area Ia,
an instruction "Check(Na)" to check whether it is permitted to pass through the designated area Na (start from or pass through the virtual area Ia),
an instruction to move to the virtual area Ib (start from or pass through the virtual area Ia) when it is permitted to pass through the designated area Na, and
an instruction "Notice(Na)" to transmit information to the apparatus 100, indicating that the designated area Na has been passed (the virtual area Ib has been reached) after moving to the virtual area Ib.

"Check(Na)" corresponds to an instruction (a check passage instruction) to check whether the designated area Na has been passed and "Notice(Na)" corresponds to an instruction (a notify passage instruction) to notify completion of passage through the designated area Na.

Note that that AGV0 cannot move further than the virtual area Ia before being permitted to pass through the area (designated node) Na by the travel controller 13 through execution of "Check(Na)." For example, if AGV0 reaches the virtual area Ia before receiving permission to pass through the area Na, AGV0 temporarily stops in the virtual area Ia. On the other hand, in the virtual area Ib, AGV0 does not need to execute "Notice(Na)" upon reaching the virtual area Ib and temporarily stop in the virtual area Ib.

On the travel route of AGV0, since the third area Pb is an arrival point, an instruction "Pd" to move to the arrival point Pb is generated.

If the instructions thus generated are arranged in the order in which the reference areas included in the travel route are arranged, the move command data shown in FIG. 14 is generated for AGV0. Move command data for AGV1 can be generated in a manner similar to AGV0. The travel controller 13 transmits the move command data generated for AGV0 and AGV1 to AGV0 and AGV1 via the communicator 14.

Upon receiving data from a mobile body, inquiring about passage through a designated area (reference area), the travel controller 13 checks the passing sequence information about the designated area. If a notice of completion of passage through the designated area has been received from all the mobile bodies earlier in sequence than the inquiring mobile body or if the inquiring mobile body is the first in the sequence, the travel controller 13 transmits a notice of permission to pass through the designated area (notice of permission to start from or pass through the virtual area) to the inquiring mobile body. In other cases, the travel controller 13 transmits a notice of non-permission to pass through the designated area to the inquiring mobile body. The operation planning apparatus 100 may transmit the notice of non-permission repeatedly until passage through the designated area is permitted. Also, upon receiving a notice of completion of passage through a designated area from the mobile body, the travel controller 13 stores the designated area indicated in the passage-complete notice in the operation plan DB 26, an internal buffer, or the like by associating the designated area with the mobile body that has sent the passage-complete notice.

The communicator 14 conducts wireless or wired communication with the mobile body. Regarding a communication scheme, any desired scheme may be used. A private protocol may be defined or a wireless LAN (Local Area Network) protocol defined by IEEE802.11 may be used.

The mobile body that has received move command data from the operation planning apparatus 100 executes the instructions contained in the move command data in sequence, thereby making the mobile body travel along the travel route from the departure point to the arrival point. If time is attached to the first instruction, the mobile body starts executing the instructions when the time comes. If time is not attached, the execution of the instructions is started immediately upon, or some time after, reception of the move command data. The timing to start the first instruction may be defined by a method other than the one described here. By taking AGV0 and AGV1 as an example, operation of mobile bodies will be described below.

AGV0 receives the first item of move command data shown in FIG. 14 and executes the instructions in the received move command data in sequence. AGV0 receives the second item of move command data shown in FIG. 14 and executes the instructions in the received move command data in sequence. Here, for the sake of explanation, it is assumed that after receiving move command data, AGV0 and AGV1 start executing instructions simultaneously.

[AGV0]

AGV0, which executes an instruction "Pa" but is already located in the area Pa, executes the next instruction "Ia" (or may skip the first instruction). By executing the instruction "Ia," AGV0 moves toward the virtual area Ia. Upon or before arriving at the virtual area Ia, AGV0 executes the instruction "Check(Na)." If AGV0 has not yet received permission to pass through Ia at the time of arrival at the virtual area Ia, AGV0 temporarily stops in the virtual area Ia. By executing the instruction "Check(Na)," AGV0 checks whether it is permitted to pass through the area Na. Specifically, AGV0 transmits data inquiring whether passage through the area Na (passage through or start from the virtual area Ia) is permitted (passage checking inquiry data) to the operation planning apparatus 100. The travel controller 13 of the operation planning apparatus 100 checks the place of AGV0 in the passing sequence based on the passing sequence information. Since the AGV0 is placed first in the passing sequence, the travel controller 13 transmits a notice of permission to pass through the area Na (notice of permission to pass through or start from the virtual area Ia) to AGV0. Being permitted to pass through the area Na (pass through or start from the virtual area Ia), AGV0 executes a next instruction Ib and thereby heads toward the virtual area Ib. In the process of heading toward the virtual area Ib, AGV0 passes through the area Na. Upon arriving at the virtual area Ib, AGV0 executes a next instruction "Notice (Na)" and thereby transmits a passage-complete notice to the operation planning apparatus 100, indicating that AGV0 has passed the area Na (arrived at the virtual area Ib). Next, AGV0 executes a next instruction "Pb" and thereby moves to the area Pb. Upon arriving at the area Pb, AGV0 finishes operation. For example, AGV0 waits until next move command data is received from the operation planning apparatus 100.

[AGV1]

AGV1, which executes an instruction "Pc" but is already located in the area Pc, executes a next instruction "Ic" (or may skip the first instruction). By executing the instruction "Ic," AGV1 heads toward the virtual area Ic. Upon or before arriving at the virtual area Ic, AGV1 executes the instruction "Check(Na)." If AGV1 has not yet received permission to pass through Ic at the time of arrival at the virtual area Ic, AGV1 temporarily stops at the virtual area Ic. By executing the next instruction "Check(Na)," AGV1 checks whether it is permitted to pass through the area Na. Specifically, AGV1 transmits data inquiring whether passage through the area Na (passage through or start from the virtual area Ic) is permitted (passage checking inquiry data) to the operation planning apparatus 100. The travel controller 13 of the operation planning apparatus 100 checks the place of AGV1 in the passing sequence based on the passing sequence information. Since the AGV1 is placed second in the passing sequence, the travel controller 13 checks whether AGV0 in the first place has passed through the area Na. If a notice of completion of passage through the area Na has been received from AGV0, it is determined that AGV0 has passed through the area Na. In this case, the travel controller 13 transmits a notice of permission (notice of permission to pass through or start from the virtual area Ic) to AGV1, permitting AGV1 to pass through the area Na. On the other hand, if a notice of completion of passage through the area Na has not been received from AGV0, the travel controller 13 determines that AGV0 has not passed through the area Na yet, and transmits a non-permission notice or no response to AGV1. When permitted to pass through the area Na (permitted to pass through or start from the virtual area Ia), AGV1 executes a next instruction "Id" and thereby heads toward the virtual area Id. If a non-permission notice or no response is received from the operation planning apparatus 100, AGV1 remains waiting in the virtual area Ic and transmits inquiry data again after a predetermined time. Alternatively, AGV1 continues waiting in the virtual area Ic until a permission notice is received from the operation planning apparatus 100. In the process of heading toward the virtual area Id, AGV1 passes through the area Na. Upon arriving at the virtual area Id, AGV1 executes a next instruction "Notice(Na)" and thereby transmits a passage-complete notice to the operation planning apparatus 100, indicating that AGV1 has passed the area Na (arrived at the virtual area Id). AGV1 executes the next instruction "Pd" and thereby moves to the area Pd. Upon arriving at the area Pd, AGV1 finishes operation. For example, AGV1 waits until next move command data is received from the operation planning apparatus 100.

Figure 15:
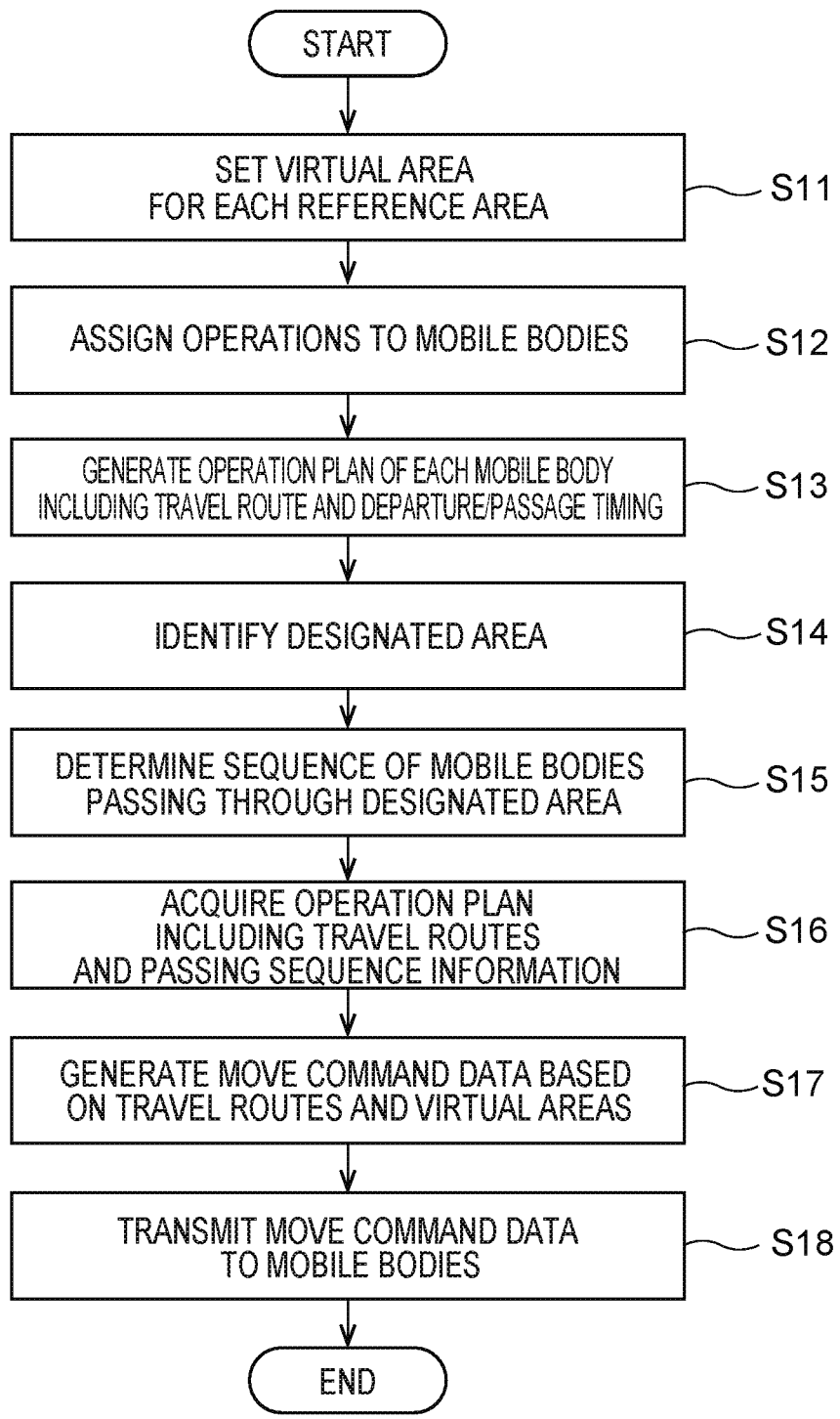
FIG. 15 is a flowchart showing an operation example of the operation planning apparatus shown in FIG. 1.

FIG. 15 is a flowchart of an operation example of the operation planning apparatus 100. Based on information stored in the travel path network information DB 23, reference area DB 22, and travel path information DB 21, the virtual area setter 11 sets a virtual area for each reference area in the travel path network. A specific process involves setting a virtual node for each reference node indicated in the structure information about the travel path network (S11).

Based on information stored in the operation information DB 25 and mobile body information DB 24, the operation plan determination device 12 assigns operations indicated by the operation information to mobile bodies (S12). Based on the travel plan assigned to the mobile bodies, the operation plan determination device 12 generates an operation plan of each mobile body (S13). The travel plan includes a travel route and departure/passage timing as an example. Based on the travel route of each mobile body, the operation plan determination device 12 identifies a reference area passed by a plurality of mobile bodies in common (S14). The identified reference area is set as a designated area. The operation plan determination device 12 determines the sequence of the mobile bodies passing through the designated area (S15). As an example, based on the departure/passage timings of the plurality of mobile bodies in the designated area, the order of the mobile bodies is determined according to the order in which the departure/passage timings come. The operation plan determination device 12 obtains information about the travel routes of the respective mobile bodies (travel route information) and information about constraints on the passing sequence in the designated area (passing sequence information) as an operation plan (S16).

Based on the travel route information about each mobile body in the operation plan and information about the virtual areas set by the virtual area setter 11, the travel controller 13 generates move command data for each mobile body (S17). More specifically, with regard to the first reference area and last reference area in the travel route, the travel controller 13 generates an instruction to move to the first reference area and an instruction to move to the last reference area. Regarding any reference area between the first reference area and last reference area, the travel controller 13 generates an instruction to move to the virtual area (designated as a virtual area A) ahead of the reference area, a check passage instruction with regard to the reference area, an instruction to move to a virtual area (designated as a virtual area B) behind the reference area (instruction to start from or pass through the virtual area A) after passage permission is obtained, and an instruction to transmit a notice of completion of passage through the reference area upon arrival at the virtual area B. The travel controller 13 generates move command data by arranging the instructions generated with regard to the respective reference areas included in the travel route, according to the arranging sequence of the reference areas. The travel controller 13 transmits the move command data generated for the mobile bodies to the mobile bodies via the communicator 14 (S18).

Figure 16:
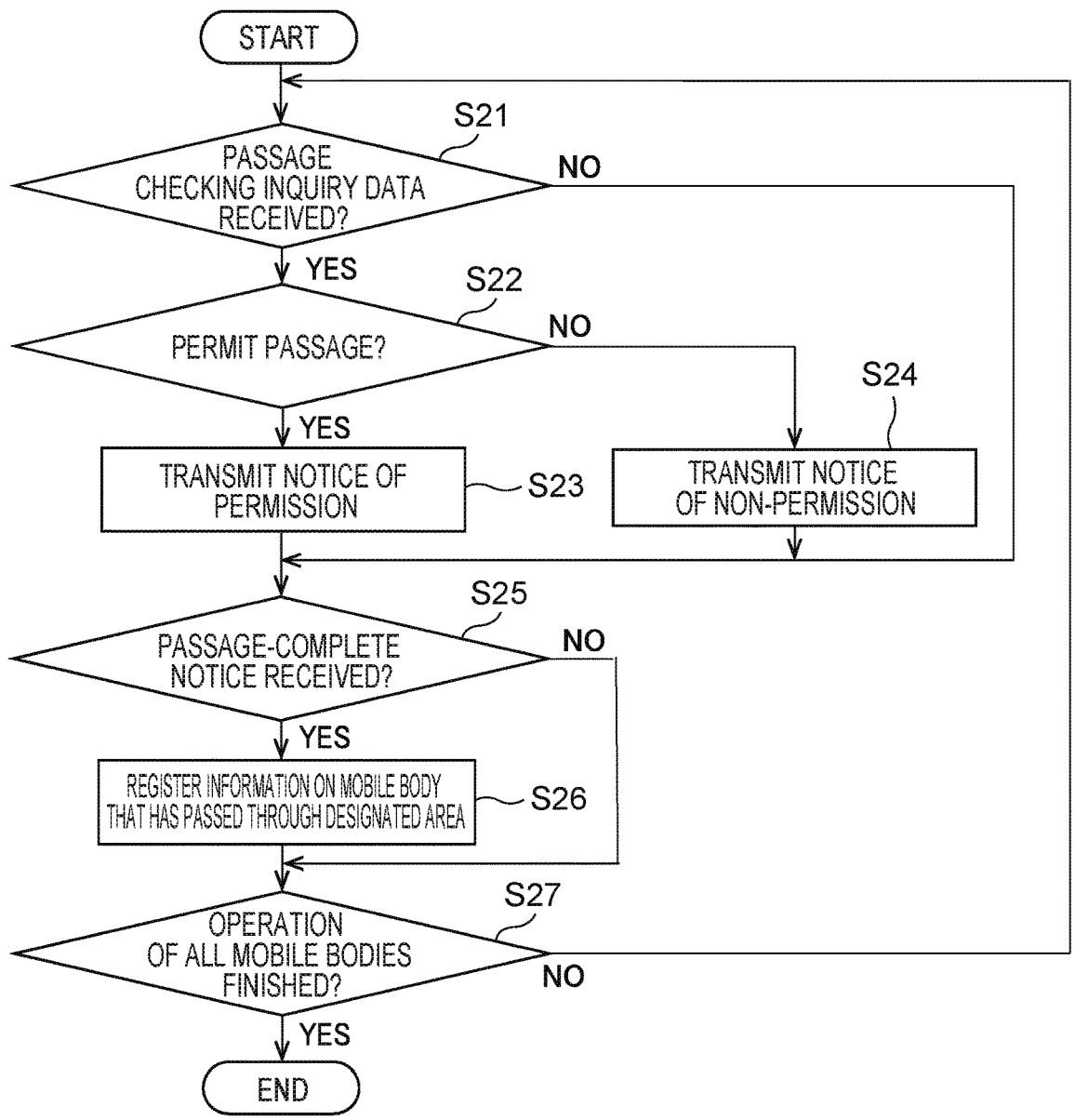
FIG. 16 is a flowchart showing another operation example of the operation planning apparatus shown in FIG. 1.

FIG. 16 is a flowchart showing an operation example of operation performed after move command data is transmitted to mobile bodies.

The travel controller 13 determines whether passage checking inquiry data with regard to a designated area (reference area) has been received from a mobile body (S21). If no inquiry data has been received (NO in S21), the travel controller 13 goes to step S25. If inquiry data has been received (YES in S21), the travel controller 13 checks the passing sequence information on the designated area indicated in the inquiry data. The travel controller 13 identifies all the mobile bodies earlier in sequence than the inquiring mobile body and determines whether a notice of completion of passage through the designated area has been received from all the identified mobile bodies or whether the inquiring mobile body is the first in the sequence (S22). If a passage-complete notice has been received from all the mobile bodies or if the inquiring mobile body is the first in the sequence, the travel controller 13 transmits a notice of permission to pass through the designated area (notice of permission to start from or pass through the virtual area) to the inquiring mobile body (S23). In other cases, the travel controller 13 transmits a notice of non-permission to pass through the designated area to the inquiring mobile body (S24).

The travel controller 13 determines whether a notice of completion of passage through a designated area has been received from any mobile body (S25). If a passage-complete notice has been received (YES in S25), the travel controller 13 stores the designated area indicated in the passage-complete notice in the operation plan DB 26, an internal buffer, or the like by associating the designated area with the mobile body that has sent the passage-complete notice (S26). If a passage-complete notice has not been received (NO in S25), the travel controller 13 goes to step S21. If an operation-complete notice has been received from all the mobile bodies, the travel controller 13 finishes the present process (YES in S27). If there is any mobile body that has not completed operation, the travel controller 13 returns to step S21.

Although in the present embodiment, virtual areas are set in advance for the reference areas in the travel path network, virtual areas may be created for the reference areas included in travel routes during creation of an operation plan.

In the present embodiment, after the mobile body passes through a designated area, a passage-complete notice is transmitted in a virtual area passed right after the designated area. When positional information of a mobile body is managed by the apparatus 100 in real time, passage of the mobile body through a designated area may be detected on the side of the apparatus 100. In that case, transmission of a passage-complete notice from the mobile body (i.e., transmission of the fourth instruction) may be omitted.

Although in the present embodiment, a virtual area is set on a travel path coupled to a designated area, this is not restrictive. For example, in a situation where a first end of a travel path is coupled to a designated area on one end and coupled to another reference area on another end, a virtual area for the designated area may be set on another travel path coupled to the other reference area. This configuration is possible, for example, when there is no need for the other reference area to manage the passing sequence of mobile bodies and the other reference area is not set as a designated area.

Although in the present embodiment, a passing sequence is generated regarding a reference area (reference node) passed by a plurality of mobile bodies, a passing sequence may be generated regarding a reference area (reference node) passed by only a single mobile body. Also, a reference area passed by only a single mobile body may be set as a designated area.

Thus, by controlling the travel of mobile bodies using the passing sequence information and the virtual areas set for designated areas, the present embodiment makes it possible to carry out operation by avoiding contention among mobile bodies. That is, in the virtual area right before each designated area, the mobile body checks whether passage through the designated area is permitted, and starts from or passes through the virtual area only when passage is permitted. This ensures the passing sequence of mobile bodies in the designated area, and thereby makes it possible to carry out operation by avoiding contention among mobile bodies regardless of disturbances and the like in the travel environment.

First Variation

In the embodiment described above, a travel plan has been created by calculating the travel routes of mobile bodies and the departure times from the reference areas included in the travel routes. Using another plan, a travel plan may be created by calculating the travel routes of a plurality of mobile bodies and the passing sequences of the mobile bodies in the reference areas included in the travel routes of the plurality of mobile bodies in common. In that case, there is no need to calculate the departure times from the reference areas. Information on the passing sequences in the reference areas can be used, as it is, as passing sequence information in an operation plan.

Second Variation

Reference areas are not limited to intersections, and may be other places where mobile bodies stop, such as loading/unloading sites, charging sites, and waiting sites of the mobile bodies. Reference areas may also be places where roads become narrow, such as change points from a two-lane route to a one-lane route. Also, reference areas may be locations where a travel path slope changes. Also, reference areas may be locations such as corners where mobile bodies change speed. It is conceivable to set places where mobile bodies could collide with each other as reference areas and set virtual areas for the reference areas to control passing sequences properly. Also, places that will become departure points of mobile bodies and places that will become destination points of operation information may be set as reference areas. Also, current positions of mobile bodies may be set as reference areas.

Third Variation

Small and large mobile bodies coexist in factories and the like.

Figure 17:
FIG. 17 is a diagram schematically showing a small mobile body and large mobile body.
Figure 17:
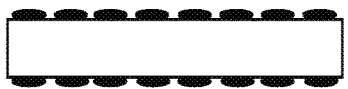

FIG. 17 schematically shows a small AGV as a small mobile body and a large AGV as a large mobile body.

Small mobile bodies and large mobile bodies differ from each other in turning radius, stopping/braking distance, and the like. Thus, the distance from a reference area to a virtual area (distance from a reference node to a virtual node) may be changed according to properties of mobile bodies. In that case, a virtual area may be set for each mobile body.

Figure 18:
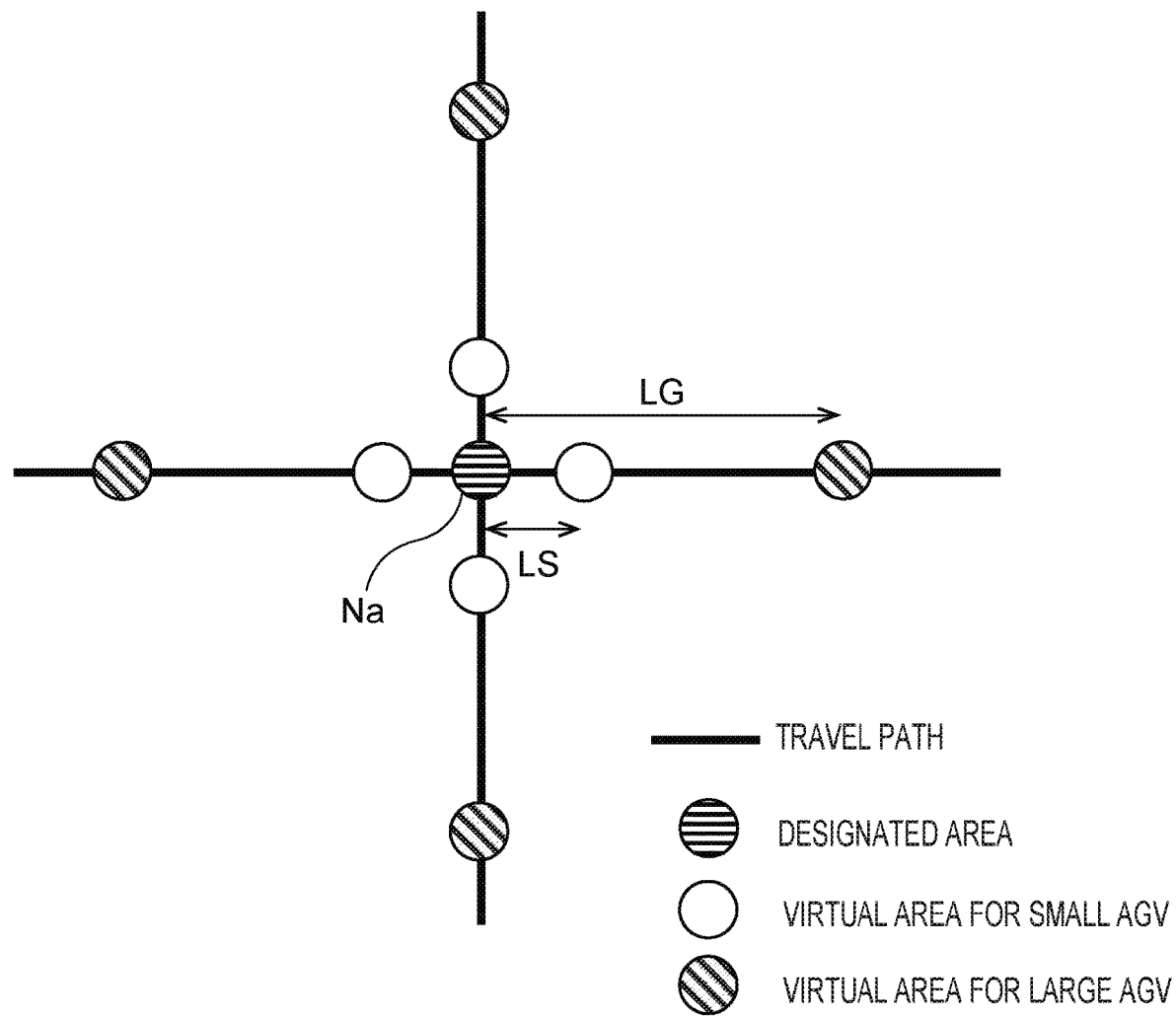
FIG. 18 is a diagram showing an example of changing the distance from a reference area to a virtual area according to properties of mobile bodies.

FIG. 18 shows an example of changing the distance from a reference area to a virtual area (distance from a reference node to a virtual node) according to properties of mobile bodies. In FIG. 18, the travel paths are represented by straight lines for convenience.

Specifically, the distance from the reference area to the virtual area is varied between the large AGV and small AGV. If LG denotes the distance from the virtual area to the reference area Na of the large AGV and LS denotes the distance from the virtual area to the reference area Na of the small AGV, the respective virtual areas of the small AGV and large AGV are set such that LG will be larger than LS. By varying the distance from the reference area Na to the virtual area between the large AGV and small AGV, it is possible to prevent contention between the mobile bodies more reliably. For example, it is conceivable that when trying to stop at the virtual area, the large AGV, which has a long stopping/braking distance, may overshoot the virtual area. In such a case, contention can be prevented by allowing for a long distance from the reference area.

Fourth Variation

The distance from a reference area to a virtual area may be changed according to properties (such as material or a friction coefficient) of travel paths.

Figure 19A:
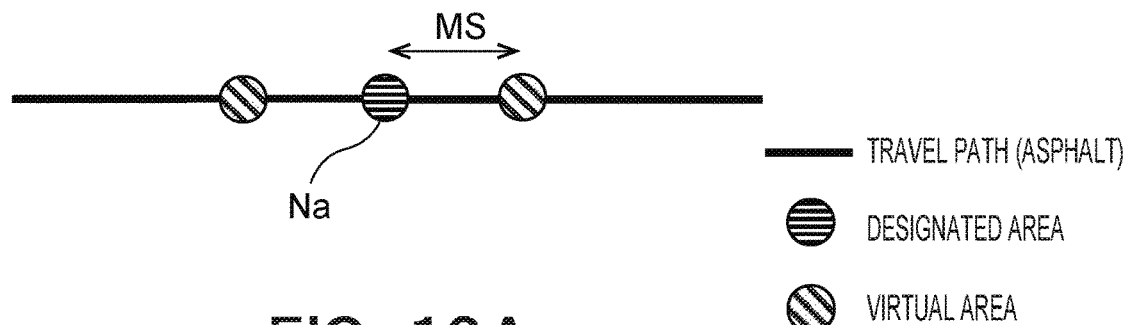
FIGS. 19A and 19B are diagrams showing an example in which virtual areas are set according to properties of travel paths.
Figure 19B:
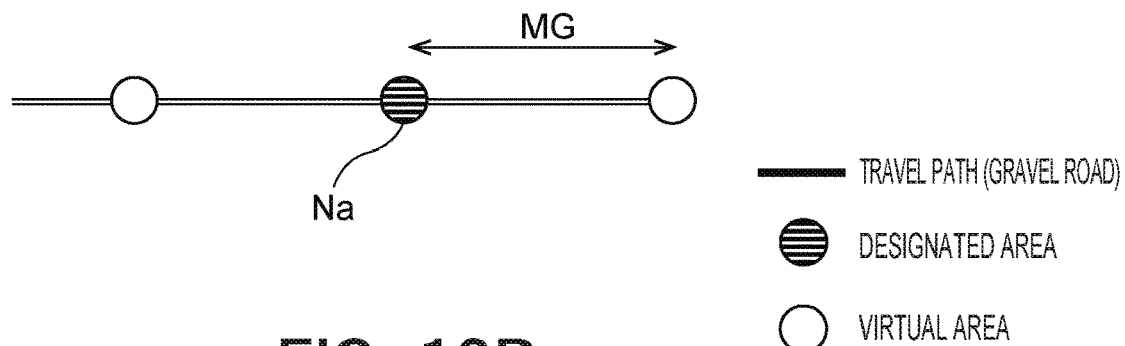

FIG. 19A shows an example of setting a virtual area in which a floor of a travel path is asphalt. FIG. 19B shows an example of setting a virtual area in which a floor of a travel path is a gravel road. In FIGS. 19A and 19B, the travel paths are represented by straight lines for convenience. When the floor of the travel path is asphalt, the distance from the reference area to the virtual area is denoted by MS, and when the floor of the travel path is a gravel road, the distance from the reference area to the virtual area is denoted by MG. MG is made larger than MS. As another example, the distance to the virtual area may be made longer when the floor of the travel path is covered with flooring than with a carpet.

Also, when a reference area is set in a location where properties (such as material or a friction coefficient) of a travel path changes, a virtual area may be set by taking the travel direction of the mobile body into consideration.

Figure 20A:
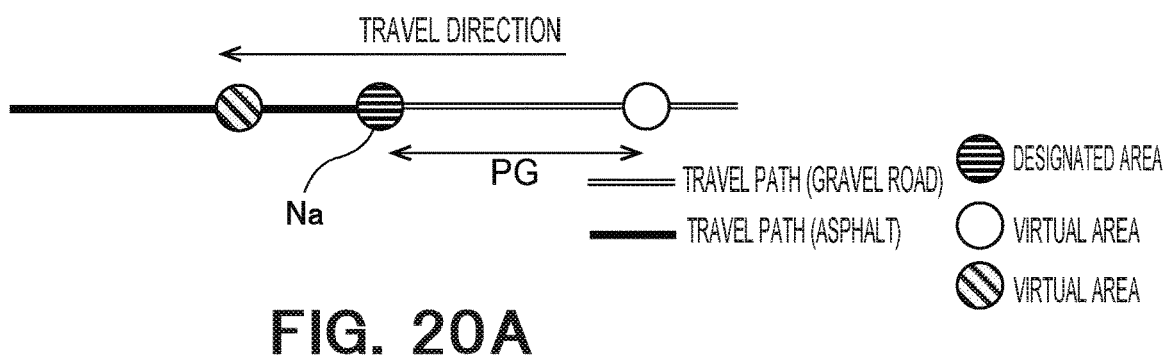
FIGS. 20A and 20B are diagrams showing an example in which virtual areas are set according to traveling direction of a mobile body.
Figure 20B:
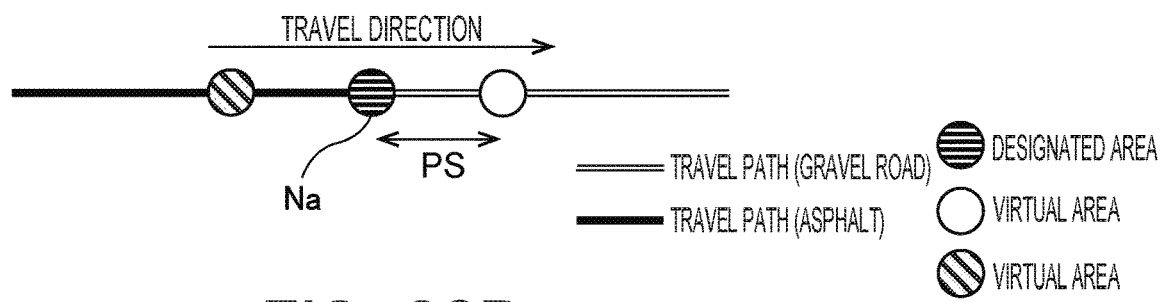

FIGS. 20A and 20B show an example in which a reference area is set in a junction between a travel path whose floor is asphalt and a travel path whose floor is a gravel road. In FIGS. 20A and 20B, the travel paths are represented by straight lines for convenience. FIG. 20A shows a case in which the mobile body enters an asphalt travel path from a gravel-road travel path. FIG. 20B shows a case in which the mobile body enters a gravel-road travel path from an asphalt travel path. A distance PG from the reference area to the virtual area on the gravel road in FIG. 20A is made longer than a distance PS from the reference area to the virtual area on the gravel road in FIG. 20B.

Fifth Variation

Information about passing directions may be set on the reference areas and virtual areas included in a travel route.

For example, the direction going upward along the plane of the paper in FIG. 7 is designated as an UP direction and the direction going downward is designated as a DOWN direction. Also, the direction going rightward along the plane of the paper is designated as a RIGHT direction and the direction going leftward is designated as a LEFT direction. In so doing, for example, the travel route of AGV0 can be expressed as "Pa, Na_up, Pb." Also, the travel route of AGV1 can be expressed as "Pa, Na_right, Pb."

Similarly, using a virtual area with direction specified, an instruction to move to the virtual area can also be generated.

Figures 21, 22:
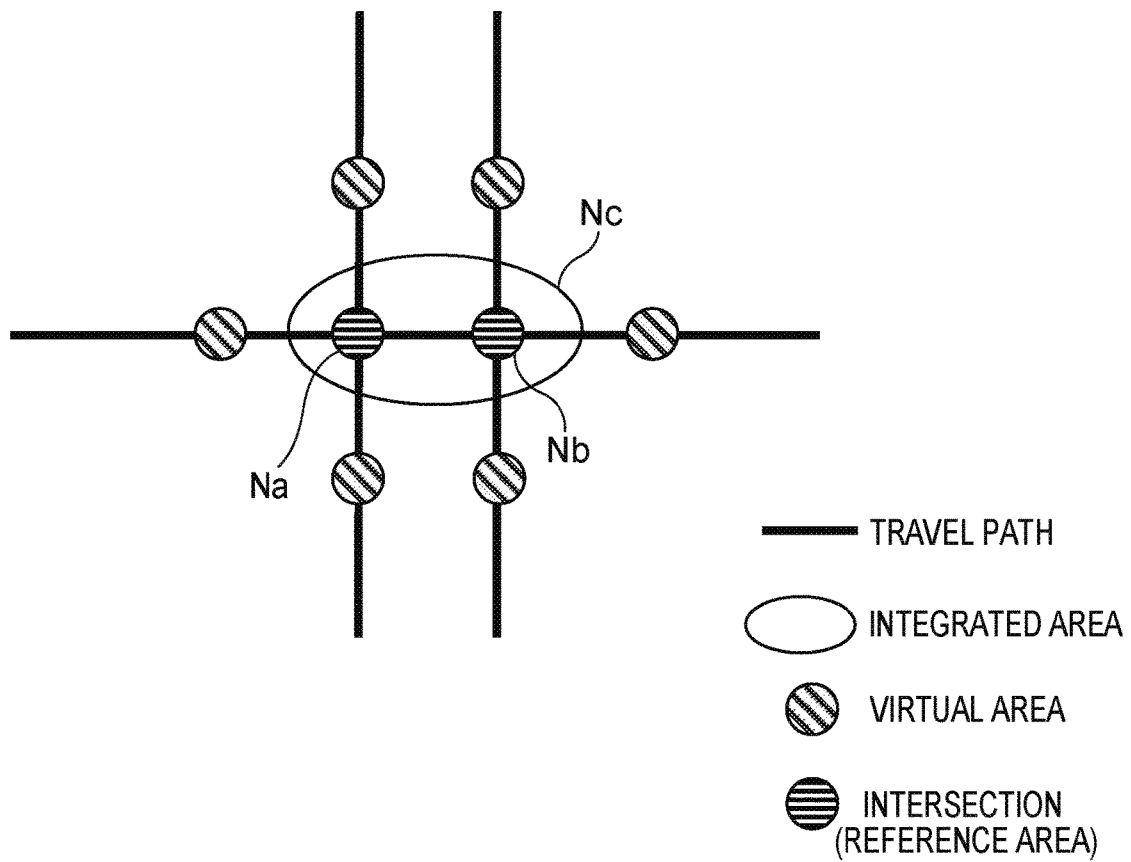
FIG. 21 is a diagram showing an example of move command data with direction specified.
FIG. 22 is a diagram showing an example of how a plurality of reference areas are united into an integrated area.

FIG. 21 shows an example of instructions (move command data) using virtual areas with direction specified. The move command data of FIG. 21 is obtained by adding directions to the instructions in the AGV0 move command data and AGV1 move command data of FIG. 14.

As illustrated in FIG. 21, the move command data for AGV0 is expressed as "Pa, Ia_right, Check(Na), Ib_up, Notice(Na), Pb." Also, the move command data for AGV1 is expressed as "Pc, Ic_up, Check(Na), Id_right, Notice(Na), Pd."

This makes it easy to control the travel of mobile bodies. For example, with the AGV1 move command data of FIG. 14, depending on the situation, the mobile body could move in such a way as to enter the virtual area Id of FIG. 7 leftward from the right side, turn right immediately after the entry, and then goes to the next area Pd. In contrast, by setting a direction in the virtual area Id and specifying the virtual area Id_right, the mobile body can be made to enter the virtual area Id_right from the left side. This makes it possible to achieve efficient travel.

Sixth Variation

It is also possible to define an integrated area by uniting a plurality of reference areas, and generate travel routes and set virtual areas using the integrated area. As an example, the integrated area corresponds to a first area. As an internal process of the apparatus 100, an integrated node is defined by uniting a plurality of reference nodes, and travel routes are generated and virtual areas are set using the integrated node. Note that in the following description, again, areas and travel paths are treated as nodes and virtual travel paths in the internal process of the apparatus 100.

FIG. 22 is a diagram showing an example of how a plurality of reference areas are united into an integrated area. In this example, the reference area Na and reference area Nb are united into an integrated area Nc. On the travel route of a mobile body, when the mobile body passes through Na and Nb, Nc is specified rather than Na and Nb.

Virtual areas are set on the travel paths coupled to the integrated area Nc from outer sides. A method for setting the virtual areas is similar to the method described above in the embodiment or any of the variations. In the example of FIG. 22, six travel paths are coupled to the integrated area Nc. A virtual area for the integrated area Nc is set on each of the six travel paths. No virtual area is set between the reference areas included in the integrated area Nc.

In this way, when the passing sequence can be managed by uniting a plurality of reference areas into one rather than handling individual reference areas, the use of the present variation makes it possible to reduce the number of virtual areas and achieve simpler travel control. Concrete examples of uniting a plurality of reference areas into an integrated area include uniting a plurality of reference areas crowded in a small area into a single integrated area.

Also, when the distance of a travel path between reference areas is shorter than a threshold, setting of a virtual area on the travel path may be omitted. This makes it possible to reduce the number of virtual areas and achieve simpler travel control. The threshold may be changed according to properties of travel paths or properties of mobile bodies.
(Hardware Configuration)

Figure 23:
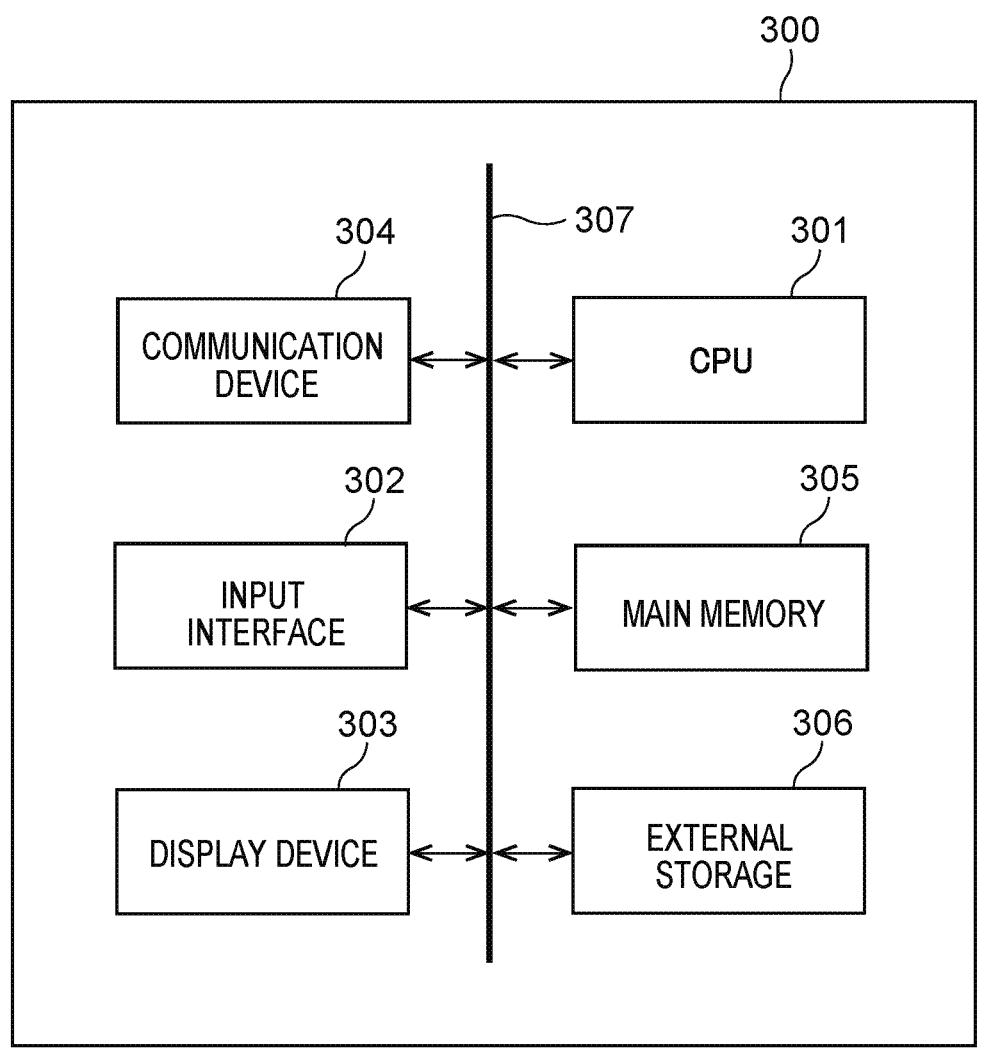
FIG. 23 is a diagram showing a hardware configuration of the operation planning apparatus of FIG. 1.

FIG. 23 illustrates a hardware configuration of the operation planning apparatus of FIG. 1 in the present approach. The operation planning apparatus of FIG. 1 is configured with a computer device 300. The computer device 300 includes a CPU 301, an input interface 302, a display device 303, a communication device 304, a main storage device 305 and an external storage device 306, which are connected to each other with a bus 307.

The CPU (central processing unit) 301 executes a computer program (operation planning program or information processing program) on the main storage device 305. The program is a program which realizes the above-described respective functional components of the operation planning apparatus 100. Each functional component is realized by the CPU 301 executing the program. The program does not have to be one program, and may be realized with combination of a plurality of programs or scripts. Each functional component is realized by the CPU 301 executing the program.

The input interface 302 is a circuit for inputting an operation signal from an input device such as a keyboard, a mouse and a touch panel to the operation planning apparatus 100.

The display device 303 displays data or information output from the operation planning apparatus 100. While the display device 303 is, for example, an LCD (Liquid Crystal Display), an organic electroluminescence display, a CRT (Cathode Ray Tube) or a PDP (Plasma Display Panel), the display device 303 is not limited to these. The data or information output from the computer device 300 can be displayed at this display device 303.

The communication device 304 is a circuit for the operation planning apparatus 100 to perform communication with an external device in a wireless or wired manner. Data can be input from the external device via the communication device 304. Information input from the external device can be stored in the main storage device 305 or the external storage device 306.

The main storage device 305 stores the program for realizing processing of the present approach, data necessary for execution of the program, data generated by execution of the program, or the like. The program is expanded on the main storage device 305 and executed. While the main storage device 305 is, for example, a RAM, a DRAM and an SRAM, the main storage device 305 is not limited to these. Each DB and each storage in FIG. 1 may be constructed on the main storage device 305.

The external storage device 306 stores the program, data necessary for execution of the program, data generated by execution of the program, or the like. These program and data are read out to the main storage device 305 in the processing of the present approach. While the external storage device 306 is, for example, a hard disk, an optical disk, a flash memory, and a magnetic tape, the external storage device 306 is not limited to these. Each DB and each storage in FIG. 1 may be constructed on the external storage device 306.

Note that the program may be installed in the computer device 300 in advance or may be stored in a storage medium such as a CD-ROM. Further, the program may be uploaded on the Internet.

The computer device 300 may be provided with one or more processors 301, input interfaces 302, display devices 303, communication devices 304 and main memories 305, and peripheral equipment such as a printer and a scanner may be connected to the computer device 300.

Further, the computer device 300 may be configured with a single computer device 300 or may be configured as a system including a plurality of computer devices 300 which are connected to each other. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A travel control apparatus comprising:
a communication circuit configured to communicate with a plurality of mobile bodies traveling in a travel path network including a plurality of first areas and a plurality of travel paths connecting the plurality of areas; and
processing circuitry configured to
set a second area on a way of each of the travel paths based on structural information of the travel path network;
identify a third area being one of the plurality of first areas through which a first mobile body and a second mobile body commonly pass based on a first travel plan of the first mobile body and a second travel plan of the second mobile body, the first travel plan including a first travel route including at least one first area through which the first mobile body passes and a timing for passing through the at least one first area, and the second travel plan including a second travel route including at least one first area through which the second mobile body passes and a timing for passing through the at least one first area;

generate passing sequence information that specifies an order in which the first mobile body and the second mobile body pass through the third area based on the first travel plan and the second travel plan;

generate movement command data including a group of commands for the first mobile body and transmit the movement command data to the first mobile body, the commands including (1) a move command for the first mobile body to move to the second area set in the way of the travel path which is connected with the third area in the first travel route and which is traveled before passing through the third area, (2) a confirmation command for the first mobile body arrived at the second area to stop at the second area and transmit a request to confirm whether the second mobile body is allowed to pass the third area, and (3) a pass command for the first mobile body to depart from the second area and pass through the third area if the first mobile body is allowed to pass through the third area in response to the request; and determine whether the first mobile body can pass through the third area based on passing sequence information and position information of the second mobile body in the travel path network upon receiving the request for confirmation from the first mobile body and transmit information indicating a result of determination whether the first mobile body is allowed to pass through the third area to the first mobile body.

2. The travel control apparatus according to claim 1, wherein:
the processing circuitry is configured to set the second area at a first distance away from the first area in the travel path connected to the first area.

3. The travel control apparatus according to claim 2, wherein the processing circuitry is configured to determine the first distance according to a property of the first mobile body.

4. The travel control apparatus according to claim 2, wherein the processing circuitry is configured to determine the first distance according to a property of the travel path in which the first mobile body travels.

5. The travel control apparatus according to claim 2, wherein the processing circuitry is configured to determine the first distance according to a travel direction in which the first mobile body travels in the travel path.

6. The travel control apparatus according to claim 1, wherein:
at least one of a direction to enter into the second area and a direction to exit from the second area is set for the second area; and
the processing circuitry is configured to determine the first travel route of the first mobile body such that the first mobile body enters the second area in the direction to enter or exits from the second area in the direction to exit.

7. The travel control apparatus according to claim 1, wherein the first area is set at an intersection where a plurality of travel paths are connected together.

8. The travel control apparatus according to claim 7, wherein the first area is set at a unit of an integrated area including a plurality of the intersections.

9. The travel control apparatus according to claim 1, wherein the first mobile body is an autonomous mobile body.

10. The travel control apparatus according to claim 1, wherein the processing circuitry is configured to transmit information indicating that the first mobile body is allowed to pass through the third area when the processing circuitry determines to allow for the first mobile body to pass through the third area.

11. The travel control apparatus according to claim 10, wherein:
the passing sequence information defines that the second mobile body passes through the first area earlier than the first mobile body, and
the processing circuitry
determines whether the second mobile body has passed through the third area after receiving the request from the first mobile body, and
determines to allow for the first mobile body to pass through the third area if the second mobile body has passed through the third area.

12. The travel control apparatus according to claim 11, wherein the processing circuitry identifies that the second mobile body has passed through the third area if the processing circuitry receives a notice indicating that the second mobile body has arrived at a second area set in the way of the travel path which is connected with the third area in the second travel route and which is traveled after passing through the third area from the second mobile body.

13. The travel control apparatus according to claim 1, wherein the processing circuitry is configured to generate the first travel plan based on a departure position and an arrival position of the first mobile body, and generate the second travel plan based on a departure position and an arrival position of the second mobile body.

14. A method comprising:
providing a database configured to store structural information of a travel path network including a plurality of first areas and a plurality of travel paths connecting the plurality of areas;
communicating with a plurality of mobile bodies traveling in the travel path network;
setting a second area on a way of each of the travel paths based on structural information of the travel path network;
identifying a third area being one of the plurality of first areas through which a first mobile body and a second mobile body commonly pass based on a first travel plan of the first mobile body and a second travel plan of the second mobile body, the first travel plan including a first travel route including at least one first area through which the first mobile body passes and a timing for passing through the at least one first area, and the second travel plan including a second travel route including at least one first area through which the second mobile body passes and a timing for passing through the at least one first area;
generating passing sequence information that specifies an order in which the first mobile body and the second mobile body pass through the third area based on the first travel plan and the second travel plan;
generating movement command data including a group of commands for the first mobile body and transmit the movement command data to the first mobile body, the commands including (1) a move command for the first mobile body to move to the second area set in the way of the travel path which is connected with the third area in the first travel route and which is traveled before passing through the third area, (2) a confirmation command for the first mobile body arrived at the second area to stop at the second area and transmit a request to confirm whether the second mobile body is allowed to pass the third area, and (3) a pass command for the first mobile body to depart from the second area and pass through the third area if the first mobile body is allowed to pass through the third area in response to the request; and determining whether the first mobile body can pass through the third area based on passing sequence information and position information of the second mobile body in the travel path network upon receiving the request for confirmation from the first mobile body and transmit information indicating a result of determination whether the first mobile body is allowed to pass through the third area to the first mobile body.

15. A non-transitory computer readable medium having a computer program stored therein which causes a computer to perform processes comprising:

reading out a database configured to store structural information of a travel path network including a plurality of first areas and a plurality of travel paths connecting the plurality of areas;

communicating with a plurality of mobile bodies traveling in the travel path network;

setting a second area on a way of each of the travel paths based on structural information of the travel path network;

identifying a third area being one of the plurality of first areas through which a first mobile body and a second mobile body commonly pass based on a first travel plan of the first mobile body and a second travel plan of the second mobile body, the first travel plan including a first travel route including at least one first area through which the first mobile body passes and a timing for passing through the at least one first area, and the second travel plan including a second travel route including at least one first area through which the second mobile body passes and the timing for passing through the at least one first area;

generating passing sequence information that specifies an order in which the first mobile body and the second mobile body pass through the third area based on the first travel plan and the second travel plan;

generating movement command data including a group of commands for the first mobile body and transmit the movement command data to the first mobile body, the commands including (1) a move command for the first mobile body to move to the second area set in the way of the travel path which is connected with the third area in the first travel route and which is traveled before passing through the third area, (2) a confirmation command for the first mobile body arrived at the second area to stop at the second area and transmit a request to confirm whether the second mobile body is allowed to pass the third area, and (3) a pass command for the first mobile body to depart from the second area and pass through the third area if the first mobile body is allowed to pass through the third area in response to the request; and determining whether the first mobile body can pass through the third area based on passing sequence information and position information of the second mobile body in the travel path network upon receiving the request for confirmation from the first mobile body and transmit information indicating a result of determination whether the first mobile body is allowed to pass through the third area to the first mobile body.

* * * * *